(12) United States Patent
Moshovos et al.

(10) Patent No.: US 12,725,018 B2
(45) Date of Patent: Sep. 1, 2026

(54) NEURAL NETWORK ACCELERATOR

(71) Applicant: SAMSUNG ELECTRONICS CO., LTD., Suwon-si (KR)

(72) Inventors: Andreas Moshovos, Toronto (CA); Alberto Delmas Lascorz, Toronto (CA); Zisis Poulos, Toronto (CA); Dylan Malone Stuart, Toronto (CA); Patrick Judd, Merlin (CA); Sayeh Sharifymoghaddam, Toronto (CA); Mostafa Mahmoud, Toronto (CA); Milos Nikolic, Toronto (CA); Kevin Chong Man Siu, Toronto (CA); Jorge Albericio, Los Altos Hills, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1067 days.

(21) Appl. No.: 16/968,678

(22) PCT Filed: Feb. 15, 2019

(86) PCT No.: PCT/CA2019/050187

§ 371 (c)(1),
(2) Date: Aug. 10, 2020

(87) PCT Pub. No.: WO2019/157599

PCT Pub. Date: Aug. 22, 2019

(65) Prior Publication Data

US 2021/0004668 A1 Jan. 7, 2021

Related U.S. Application Data

(60) Provisional application No. 62/664,190, filed on Apr. 29, 2018, provisional application No. 62/710,488, filed on Feb. 16, 2018.

(51) Int. Cl.
*G06N 3/06* (2006.01)
*G06F 13/42* (2006.01)
*G06N 3/063* (2023.01)

(52) U.S. Cl.
CPC ......... *G06N 3/063* (2013.01); *G06F 13/4282* (2013.01)

(58) Field of Classification Search
CPC ........ G06N 3/063; G06N 3/045; G06N 3/048; G06N 3/084; G06F 13/4282
See application file for complete search history.

(56) References Cited

U.S. PATENT DOCUMENTS 5,751,913 A 5/1998 Chiueh
6,199,057 B1 3/2001 Tawel
(Continued)

FOREIGN PATENT DOCUMENTS

CN 107533667 A 1/2018
WO 2017/214728 A1 12/2017

OTHER PUBLICATIONS

Albericio et al. Cnvlutin: Ineffectual-Neuron-Free Deep Neural Network Computing, 2016, 13 pages (Year: 2016).*
(Continued)

*Primary Examiner* — Omar F Fernandez Rivas
*Assistant Examiner* — Tri T Nguyen
(74) *Attorney, Agent, or Firm* — NSIP Law

(57) ABSTRACT

Described is a neural network accelerator tile for exploiting input sparsity. The tile includes a weight memory to supply each weight lane with a weight and a weight selection metadata, an activation selection unit to receive a set of input activation values and rearrange the set of input activation values to supply each activation lane with a set of rearranged activation values, a set of multiplexers including at least one multiplexer per pair of activation and weight lanes, where
(Continued)

each multiplexer is configured to select a combination activation value for the activation lane from the activation lane set of rearranged activation values based on the weight lane weight selection metadata, and a set of combination units including at least one combination unit per multiplexer, where each combination unit is configured to combine the activation lane combination value with the weight lane weight to output a weight lane product.

39 Claims, 21 Drawing Sheets

(56) References Cited

U.S. PATENT DOCUMENTS

| | | | | |
|---|---|---|---|---|
| 9,710,265 | B1 | 7/2017 | Temam | |
| 9,818,059 | B1 * | 11/2017 | Woo | G06N 3/063 |
| 10,127,494 | B1 * | 11/2018 | Cantin | G06N 3/065 |
| 10,417,555 | B2 * | 9/2019 | Brothers | G06T 1/60 |
| 10,467,795 | B2 * | 11/2019 | Sarel | G06N 3/045 |
| 10,521,488 | B1 * | 12/2019 | Ross | G06F 15/8046 |
| 2015/0310311 | A1 | 10/2015 | Shi | |
| 2016/0342893 | A1 * | 11/2016 | Ross | G06F 17/153 |
| 2016/0358069 | A1 * | 12/2016 | Brothers | G06F 7/764 |
| 2016/0364644 | A1 * | 12/2016 | Brothers | G06N 3/049 |
| 2017/0344876 | A1 * | 11/2017 | Brothers | G06F 17/153 |
| 2018/0046900 | A1 * | 2/2018 | Dally | G06N 3/082 |
| 2018/0089562 | A1 * | 3/2018 | Jin | G06N 3/063 |
| 2018/0129935 | A1 * | 5/2018 | Kim | G06F 17/153 |
| 2018/0173571 | A1 * | 6/2018 | Huang | G06N 3/063 |
| 2018/0197067 | A1 * | 7/2018 | Mody | G06N 3/08 |
| 2018/0218518 | A1 * | 8/2018 | Yan | G06T 9/002 |
| 2019/0050734 | A1 * | 2/2019 | Li | G06N 3/04 |
| 2019/0171634 | A1 * | 6/2019 | Nowakiewicz | G06F 16/244 |

OTHER PUBLICATIONS

Judd et al. Proteus: Exploiting Numerical Precision Variability in Deep Neural Networks, Jun. 2016, 12 pages (Year: 2016).*

Judd et al. Stripes: Bit-Serial Deep Neural Network Computing, 2016, 12 pages (Year: 2016).*

Parash et al., "SCNN: An accelerator for compressed-sparse convolutional neural networks", ISCA '17: Proceedings of the 44th Annual International Symposium on Computer Architecture, Association for Computing Machinery, New York, NY, USA, Jun. 24, 2017, pp. 27-40.

Qin et al., "SIGMA: A Sparse and Irregular GEMM Accelerator with Flexible Interconnects for DNN Training", 2020 IEEE International Symposium on High Performance Computer Architecture (HPCA), IEEE, San Diego, CA, USA, 2020, pp. 58-70.

Gupta et al., "MASR: A Modular Accelerator for Sparse RNNs", 2019 28th International Conference on Parallel Architectures and Compilation Techniques (PACT), IEEE, Seattle, WA, USA, 2019, pp. 1-14.

Gondimalla et al., "SparTen: A Sparse Tensor Accelerator for Convolutional Neural Networks", Micro '52: Proceedings of the 52nd Annual IEEE/ACM International Symposium on Microarchitecture, Association for Computing Machinery, New York, NY, USA, Oct. 12, 2019, pp. 151-165.

Kung et al., "Packing Sparse Convolutional Neural Networks for Efficient Systolic Array Implementations: Column Combining Under Joint Optimization", Proceedings of the Twenty-Fourth International Conference on Architectural Support for Programming Languages and Operating Systems (ASPLOS '19), Association for Computing Machinery, New York, NY, USA, 2019, pp. 821-834.

Zhang et al., "Cambricon-X: An accelerator for sparse neural networks", 2016 49th Annual IEEE/ACM International Symposium on Microarchitecture (Micro), IEEE, Taipei, Taiwan, 2016, pp. 1-12.

Han et al., "EIE: Efficient Inference Engine on Compressed Deep Neural Network", 2016 ACM/IEEE 43rd Annual International Symposium on Computer Architecture (ISCA), IEEE, Seoul, South Korea, 2016, pp. 243-254.

Kim et al., "ZeNA: Zero-Aware Neural Network Accelerator", IEEE Design & Test, vol. 35, No. 1, IEEE, Feb. 2018, pp. 39-46.

Han et al., "ESE: Efficient Speech Recognition Engine with Sparse LSTM on FPGA", FPGA '17: Proceedings of the 2017 ACM/SIGDA International Symposium on Field-Programmable Gate Arrays, Association for Computing Machinery, New York, NY, USA, Feb. 22, 2017, pp. 75-84.

Singapore Office Action issued on Jun. 29, 2022, in counterpart Singapore Patent Application No. 11202007532T (9 pages in English).

Chinese Office Action issued on Jan. 5, 2024, in counterpart Chinese Patent Application No. 201980014141.X (7 pages in English, 6 pages in Chinese).

* cited by examiner

```
for wx = 0 to Ax-Fx step S
  for wy = 0 to Ay-Fy step S
    for c = 0 to C-1
      for fx = 0 to Fx-1
        for fy = 0 to Fy-1
          for k = 0 to K-1
              ax = wx + fx
              ay = wy + fy
              ox = wx / S
              oy = wy / S
              O[ox, oy, c] +=
               F[k][fx, fy, c] * A[ax,ay,c]
```

FIG. 2

(a) Dense Filter (b) Sparse Filter (a) Cycle 0

(b) Cycle 1

(c) Cycle 2

(b) Cycle 1

(a) Tile.

(c) ASU: Activation Selection Unit.

NEURAL NETWORK ACCELERATOR

FIELD OF THE INVENTION

The present specification relates generally to hardware architecture for neural networks, and more specifically to neural network hardware accelerators.

BACKGROUND OF THE INVENTION

Deep Learning Neural Networks (DNNs) have been finding a growing number of applications executing on a variety of computing platforms from high-end servers to mobile and embedded systems. Given the growing importance of DNN workloads and their high computation and memory demands, specialized hardware accelerators have emerged.

Several types of DNNs exist, such as Convolutional Neural Networks (CNNs) which have been dominating image-based applications. For example, CNNs may be used for inference of images or video frames, and the acceleration of inference with CNNs, particularly convolutional layers which tend to dominate execution time in CNNs is often desired.

Recent developments in the field of acceleration of neural networks include a push toward hardware implementations. For example, circuits have been developed which are designed to more closely emulate the behavior of neurons, such as with high network connectivity or other features.

SUMMARY OF THE INVENTION

According to an embodiment of the present invention, there is provided a neural network accelerator tile for exploiting input sparsity defining a set of weight lanes and a set of activation lanes, each weight lane corresponding to an activation lane, the tile comprising: a weight memory to supply each weight lane of the set of weight lanes with a weight and a weight selection metadata; an activation selection unit to receive a set of input activation values and rearrange the set of input activation values to supply each activation lane with a set of rearranged activation values; a set of multiplexers, the set of multiplexers including at least one multiplexer per pair of activation and weight lanes, each multiplexer configured to select a combination activation value for the activation lane from the activation lane set of rearranged activation values based on the weight lane weight selection metadata; and a set of combination units, the set of combination units including at least one combination unit per multiplexer, each combination unit configured to combine the activation lane combination value with the weight lane weight to output a weight lane product.

According to a further embodiment of the invention, there is provided an accelerator tile comprising: an activation selection unit to receive a set of activation values and rearrange the set of activation values into at least one set of multiplexer input values; a set of weight value receptors to receive at least one weight and at least one weight selection metadata; at least one multiplexer to receive at least one of the at least one set of multiplexer input values and at least one weight selection metadata, the at least one multiplexer configured to apply the at least one weight selection metadata to select at least one combination activation value from the at least one set of multiplexer input values; at least one combinator to apply the at least one combination activation value to the at least one weight to produce at least one product; and at least one product output dispenser to output the at least one product.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which:

FIG. 2 is an example pseudocode convolutional layer calculation;

Like reference numerals indicated like or corresponding elements in the drawings.

DETAILED DESCRIPTION OF THE EMBODIMENTS

Figure 1:
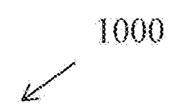
FIG. 1 is a schematic diagram of an example convolutional layer.
Figure 1:
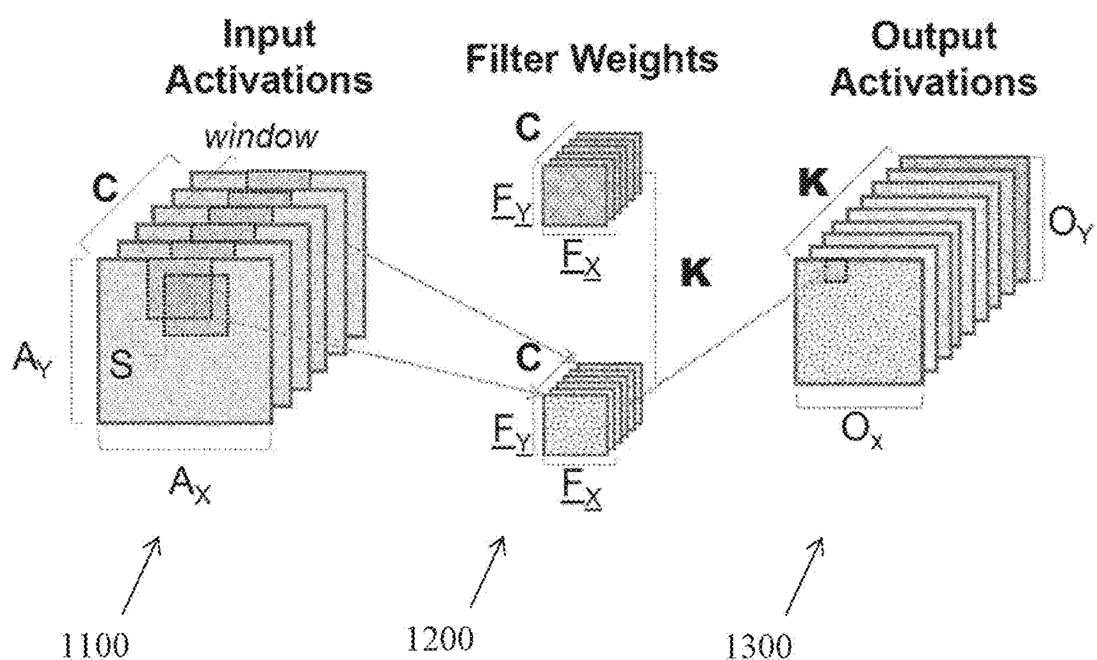

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale, and in some instances, proportions may have been exaggerated in order more clearly to depict certain features of the invention.

This description relates to hardware accelerators for neural networks and is described with particular reference to configurations used for inference with Convolutional Neural Networks (CNN).

CNNs often comprise a chain of layers or direct acyclic graphs, with convolutional layers (CVLs) dominating execution time for many image related applications. In the embodiment depicted in FIG. 1, a convolutional layer 1000 receives an $A_x \times A_y \times C$ activation array 1100, which is convolved with a set 1200 of K weight filter arrays, the set 1200 being the set of $F^0$ to $F^{K-1}$ $F_x \times F_y \times C$ filter arrays, producing an $O_x \times O_y \times K$ output activation array 1300. Each output activation o(x,y,k) of output activation array 1300 is the dot product of filter $F^k$ with an $F_x \times F_y \times C$ subarray window of the input activation array 1100. Windows are evenly spaced using a stride S, resulting in $\lceil A_x/S \rceil \times \lceil A_y/S \rceil = O_x \times O_y$. An activation function, such as the Rectifier Linear Unit (ReLU), is applied to each output activation. Often, a layer, such as the embodiment depicted in FIG. 1, requires 100 s to 1000 s of dot product calculations to produce an output activation array, each of 100 s to 1000 s of input weight and activation pairs.

As depicted in FIG. 2, in an embodiment a CVL may be implemented as a 6-nested loop. In some embodiments the multiplications of the loop are independent, and different permutations of the loop produce the same output activation array, and in some permutations, calculations can be executed concurrently.

While CVLs are often seen as a particular type of layer in a particular type of neural network, other types of layers can be implemented as variations of a CVL. For example, a fully connected layer can be implemented as a CVL with a single window and where the filters and the input are of the same dimensions.

The CVL implemented by the 6-nested loop of FIG. 2 processed the activations and weights as if processing a dense CNN, since it processes all weights and activations. However, in practice some weights are zero and some activations are zero or close enough to zero to be treated as zero, and hence are ineffectual. Many neural networks are sparse for a variety of reasons, for example weight pruning, which often requires retraining the CNN, can also contribute to weight sparsity.

Embodiments of hardware accelerators exploit sparsity, such as sparsity in either or both of the weights and the activations. In embodiments of the present invention, weight sparsity is exploited directly, and activation sparsity is exploited indirectly. Embodiments are able to produce benefits even for effectual activations.

Figure 3:
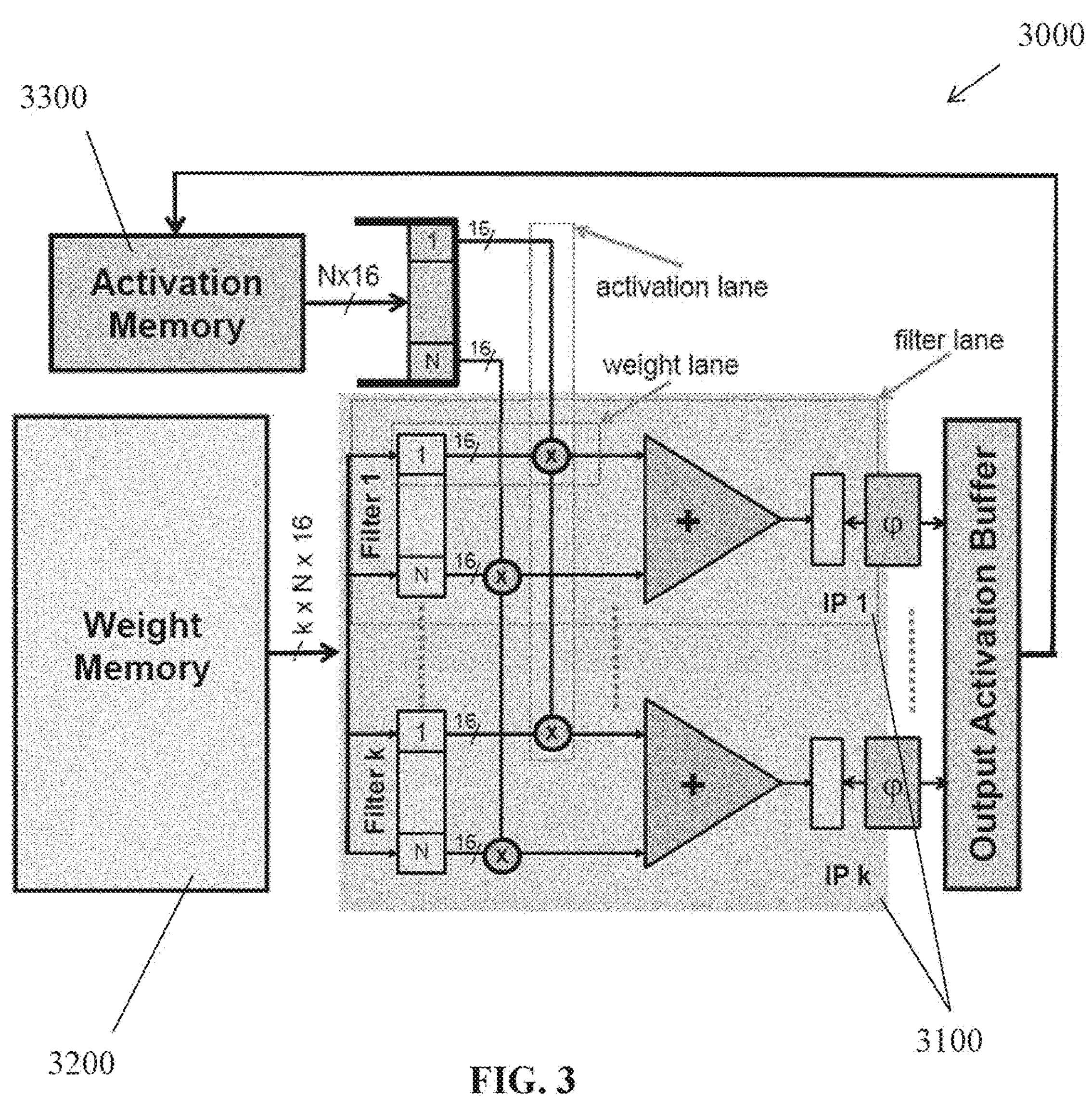
FIG. 3 is a schematic diagram of a dense neural network accelerator tile.

An example of a data-parallel hardware accelerator 3000 for processing a dense CNN is depicted in FIG. 3, such as for processing the CVL depicted in FIG. 1. Data-parallel hardware accelerator 3000 processes weights and activations in cycles and produces k partial output activations per cycle. Data-parallel hardware accelerator 3000 includes k Inner Product Units (IPU) 3100 operating in parallel over the same set of N activations. Each input activation is multiplied with k weights, one per filter of the set of filters 1200 as follows: each IPU 3100 accepts a vector of N weights per cycle, one per input activation, calculates N products, reduces them via an adder tree, and accumulates the result into an output register. Once a full window has been processed, usually over multiple cycles, the output register contains the corresponding output activation.

Data-parallel hardware accelerator 3000 includes a weight memory 3200 and an activation memory 3300, which provide the weights and activations, respectively, to the accelerator 3000. In the embodiment depicted, similar to the embodiment disclosed in Y. Chen, T Luo, S. Liu, S. Zhang, L. He, J. Wang, L. Li, T Chen, Z. Xu, N. Sun, and O. Temam, "Dadiannao: A machine-learning supercomputer," in *Microarchitecture* (*MICRO*), 2014 47th *Annual IEEE/ACM International Symposium on*, pp. 609-622, December 2014, the weight memory 3200 and activation memory 3300 are large enough to hold a full layer at a time, the weight memory 3200 can supply N×k weights per cycle via a single, wide read port, the activation memory 3300 can supply N activations per cycle via a wide read port, weight and activation buffers hide the latency of the weight memory 3200 and activation memory 3300, and an output activation buffer collects the results prior to writing them back to the activation memory 3300 for the next layer in the neural network. As depicted, accelerator 3000 uses a 16-bit fixed point format to represent activations and weights, as do many embodiments of inference accelerators. The embodiment depicted in FIG. 3 assumes that if multiple tiles exist, they are all connected to the same activation memory 3300, which broadcasts a block of N activations per cycle to all tiles.

Figures 4A, 4B:
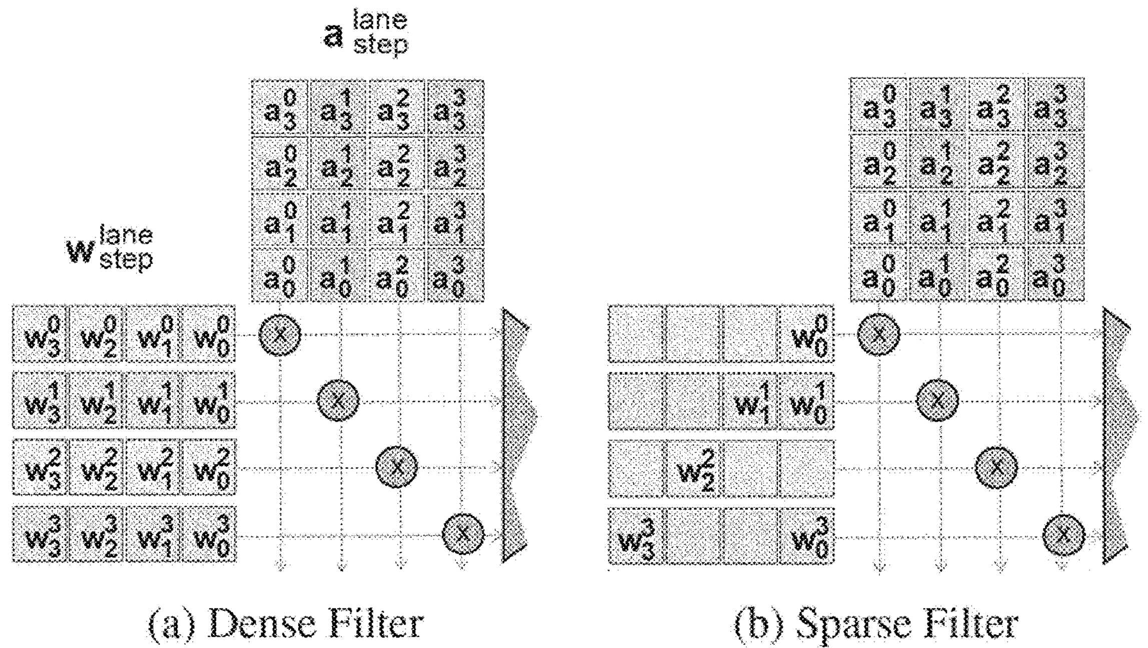
FIGS. 4A to 4B are example schematic diagrams of CNN functionality.

FIGS. 4A and 4B depict an example of how the IPU 3100 of accelerator 3000 of FIG. 3 would process activations and steps, and in which N is set to 4 and k is set to 1. Activations are denoted as $$a_{step}^{lane}$$

and weights are denoted as $$w_{step}^{lane},$$

where lane designates the activation column and weight row they appear at, and step designates the order in time in which they are multiplied. Assuming that each step requires a single cycle, accelerator 3000 would process the 16 products in 4 cycles, regardless of whether the set of weights is dense as in FIG. 4A or sparse as in FIG. 4B. This is despite the fact that the 6 products required in the example of FIG. 4B could be done in 2 cycles if the products were freely scheduled. Embodiments of the present invention eliminate products with ineffectual weights while avoiding the complexities of an unrestricted schedule of weights and activations.

Embodiments of the present invention eliminate ineffectual weights by statically promoting effectual weights in time, by processing them when it would otherwise be processing an ineffectual weight. A software scheduling pass rearranges the weights prior to processing so that they appear at the right lane and step when fetched at runtime. As a result, a tile of such an embodiment can access all k×N weights it needs per step with a single wide access to an associated weight memory. Each effective weight carries with it a narrow piece of metadata to identify its position in the original dense weight schedule so that it can be matched at runtime with the appropriate activation.

In embodiments weight scheduling flexibility may be balanced with energy and area efficiency, such as by allowing schedules where only two intra-filter weight movements are permitted: a lookahead movement and a lookaside movement. A lookahead movement allows an effectual weight to advance in step to replace an ineffectual weight, such as to advance effectual weight w[lane, step] to replace ineffectual weight w[lane, step-h], where h is a lookahead depth which is linked to the number of activation values that must be made available in an accelerator architecture. A lookaside movement allows an effectual weight to replace an ineffectual weight in a different lane, for example effectual weight w[lane, step] may be advanced one time step and shifted d lanes to replace ineffectual weight w[(lane+d) MOD(N−1), step−1].

Figure 5A:
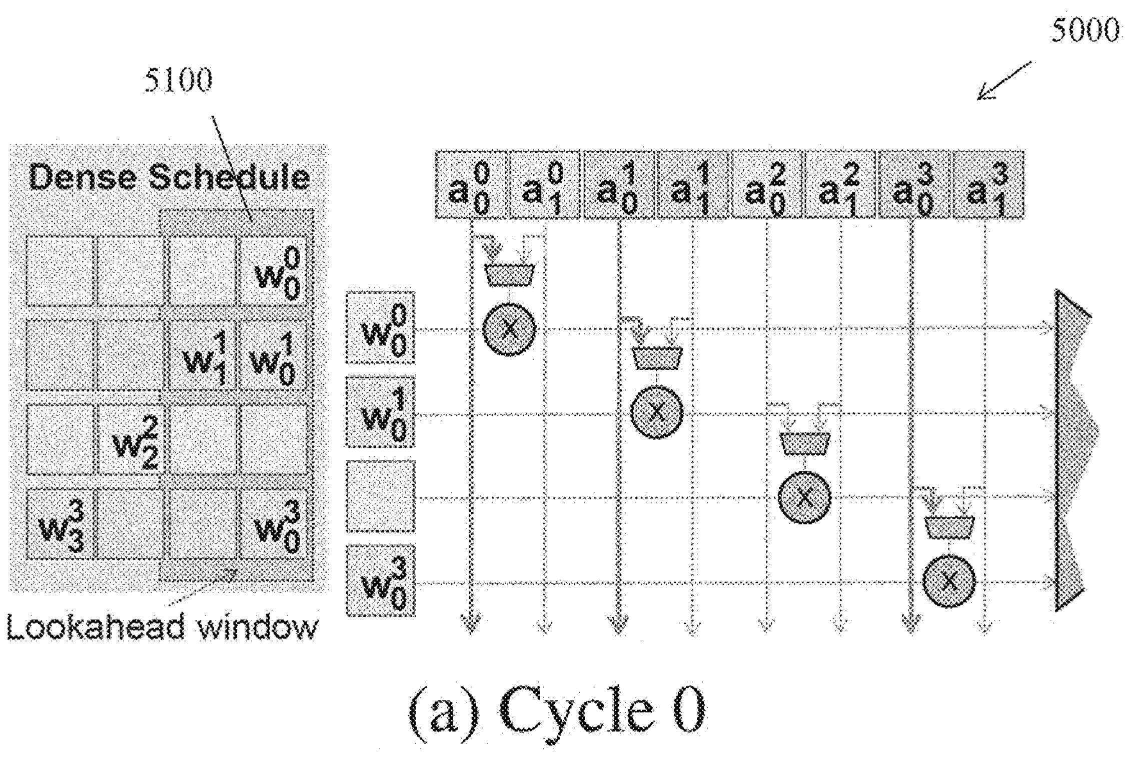
FIGS. 5A to 5C are schematic diagrams of lookahead functionality, according to an embodiment.
Figure 5B:
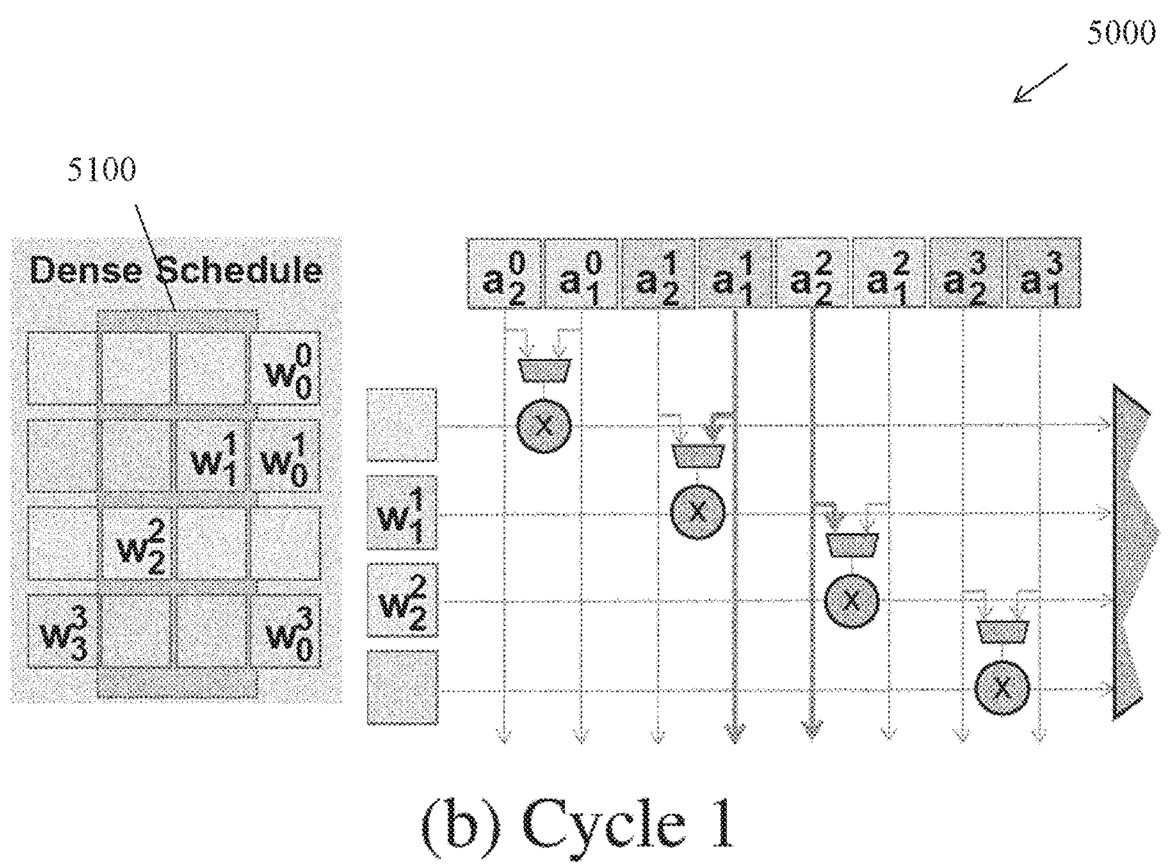
Figure 5C:
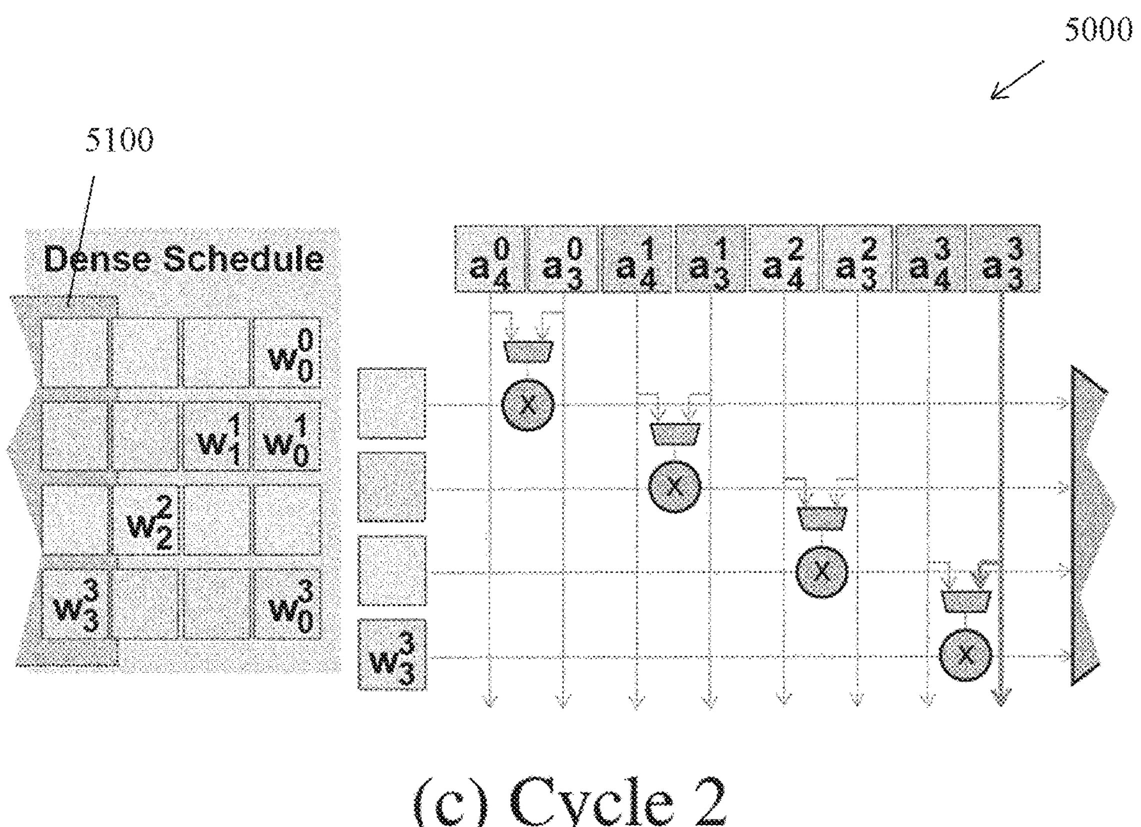

FIGS. 5A to 5C show a schematic diagram of an example of lookahead weight scheduling for an accelerator 5000 applying the sparse filter depicted in FIG. 4B. As illustrated by FIGS. 5A to 5C, setting h=1 reduces execution time from 4 cycles to 3. As with the accelerator embodiment of FIGS. 4A to 4B, the accelerator 5000 of FIGS. 5A to 5C can process 4 products per cycle. The use of lookahead allows the accelerator 5000 to establish a sliding window of h+1 within which effectual weights can be promoted over ineffectual weights appearing in the same lane.

At cycle 0 depicted in FIG. 5A, the lookahead window 5100 fails to utilize weight lane 2 singe weight w[2, 2] is a lookahead distance 2 and h is set to 1. In FIG. 5B at cycle 1, effectual weight w[1, 1] is being processed, so lookahead window 5100 extends the reach of accelerator 5000 to step 1=h, or 2. This allows accelerator 5000 to promote effectual weight w[2, 2] to replace ineffectual weight w[2, 1], yet weight w[3, 3] remains out of lookahead window 5100. However, since there are no longer any weights to be processed at step 3, accelerator 5000 then progresses two steps to step=3, such that, as shown in FIG. 5C at cycle 2, weight w[3, 3] is processed.

As depicted in FIGS. 5A to 5C, the static promotion of weights within lanes requires that accelerator 5000 have access to the corresponding activation at runtime. As depicted, to allow this pairing, accelerator 5000 has access to all activations for the full lookahead window 5100. As h has been set to 1, there are 2 activation lanes made available to accelerator 5000 in each cycle. Accelerator 5000 selected the appropriate activation via a per weight lane 2-to-1 multiplexer, the control signal for the multiplexer is determined statically when the weight schedule is modified for the lookahead function, and the control signal is stored along with the corresponding weight.

Accelerator 5000 uses h extra activation lanes an (h+1)-to-1 multiplexer to select the appropriate activation for a lookahead window of h, where h as depicted is set to 1. In various embodiments, the support of a wider group of activations leads to variations in cost and practicality in the construction of accelerators. As activation lanes are shared among k filters per tile in other embodiments of an accelerator, the cost of including activation lanes can often be amortized over multiple weight lanes. In many cases the benefits of applying a lookahead structure to an accelerator are available with h less than or equal to 2.

Figure 6A:
FIGS. 6A to 6B are schematic diagrams of lookaside functionality, according to an embodiment.
Figure 6A:
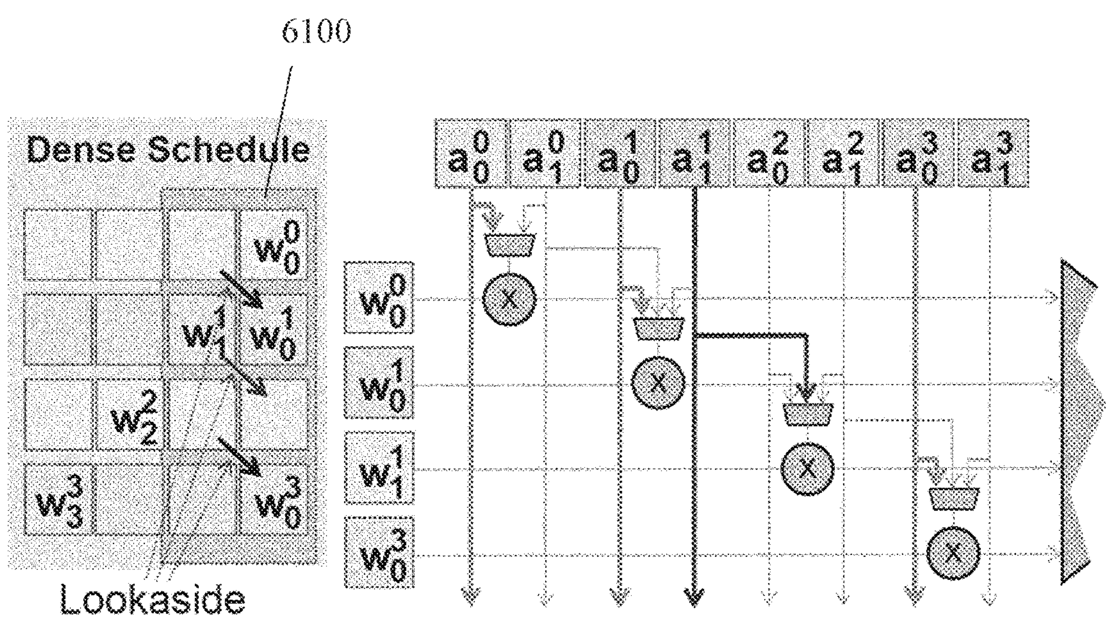
Figure 6B:
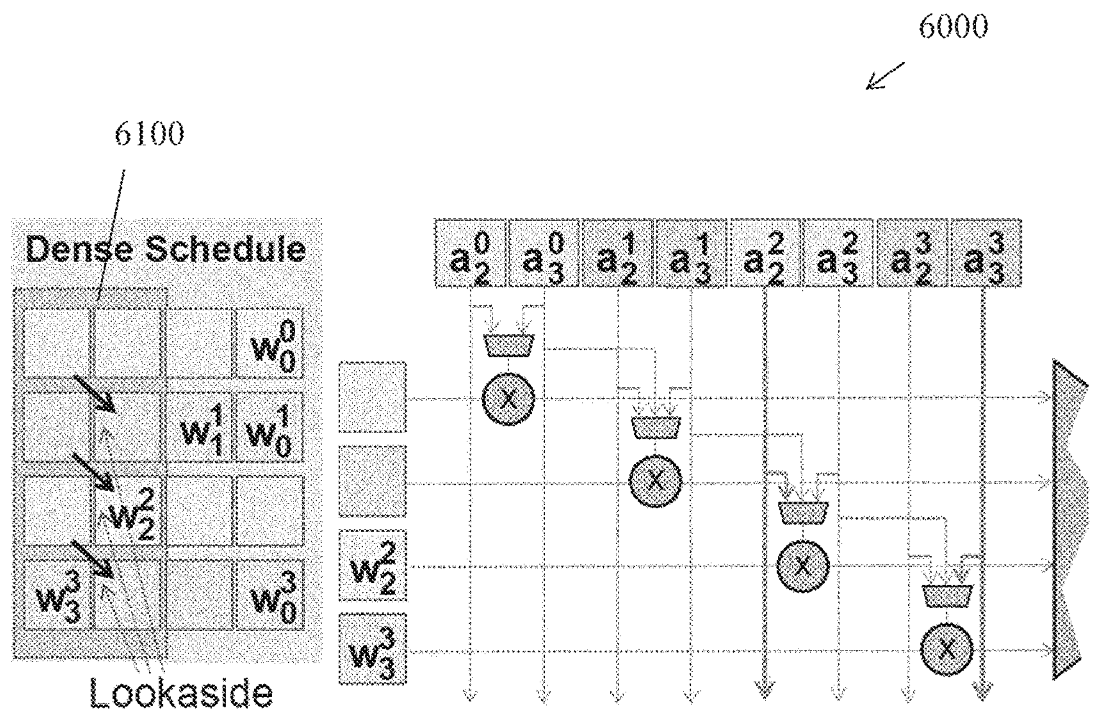

FIGS. 6A to 6B are a schematic diagram of an accelerator 6000 employing a lookaside structure. The cycle reduction permitted by the lookahead structure of accelerator 5000 is limited to the number of effectual weights in the lane with the most effectual weights. The lookaside structure of accelerator 6000 allows accelerator 6000 to process the weight of one lane in another lane, allowing the accelerator 6000 to process the weights of more densely populated lanes of the original weight structure in a time and lane step of a neighboring less densely populated lane.

Accelerator 6000 employs a lookaside structure in which d has been set to 1. As depicted in FIG. 6A at cycle 0, lane 2 processes weight w[1, 1] from lane 1 allowing lane 2 of accelerator 6000 to process a weight rather than remain idle at step 0. This also permits accelerator 6000 to process the set of weights in two steps, as it is able to advance to step 2 and process both weight w[2, 2] and weight w[3, 3] at cycle 1 when also employing a lookahead of h=1. Accelerator 6000 is thus able to process the set of weights of FIG. 4B in the minimum number of cycles by employing a lookahead and a lookaside structure and setting h=d=1.

As accelerator 6000 employed a lookahead structure where h=1, it had two activation lanes available to each weight lane at each time step. As a result, employing a lookaside structure where d=1 does not require accelerator 6000 to be provided with any addition activation lanes, accelerator 6000 only requires an activation multiplexer with more inputs. Accelerator 6000 employs (h+d+1)-to-1 multiplexers for lookaside set to h and lookahead set to d. The data input connections for these multiplexers are statically determined and regular. As with accelerator 5000, the control signal for the multiplexers of accelerator 6000 is determined statically and stored along with the weights, and it requires lg(h+d+1) bits. In accelerator variations an increased d value may allow for greater scheduling flexibility but may come at an increased interconnect cost.

Figure 7A:
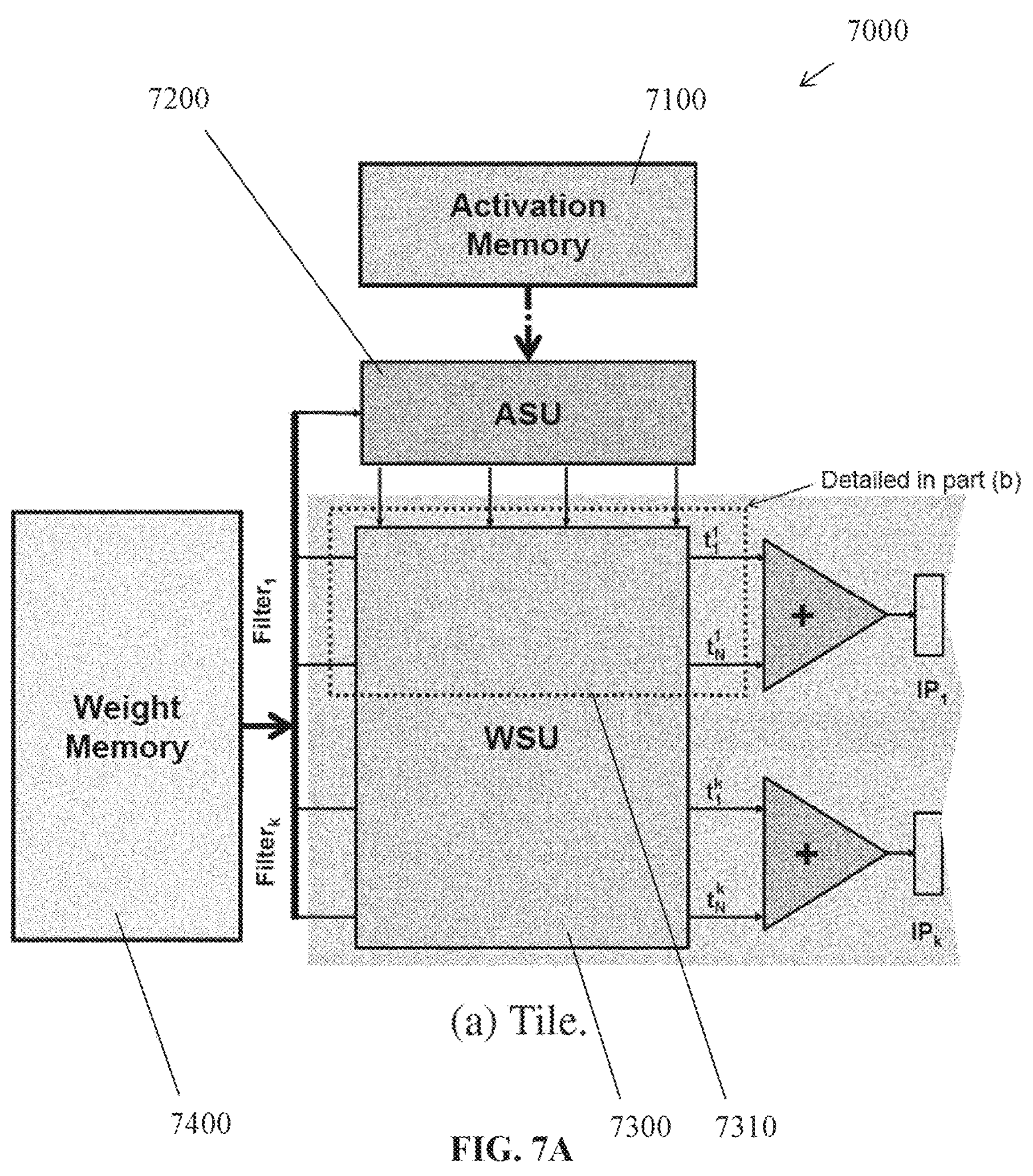
FIGS. 7A to 7C are schematic diagrams of weight skipping accelerator tile architecture, according to an embodiment.
Figure 7B:
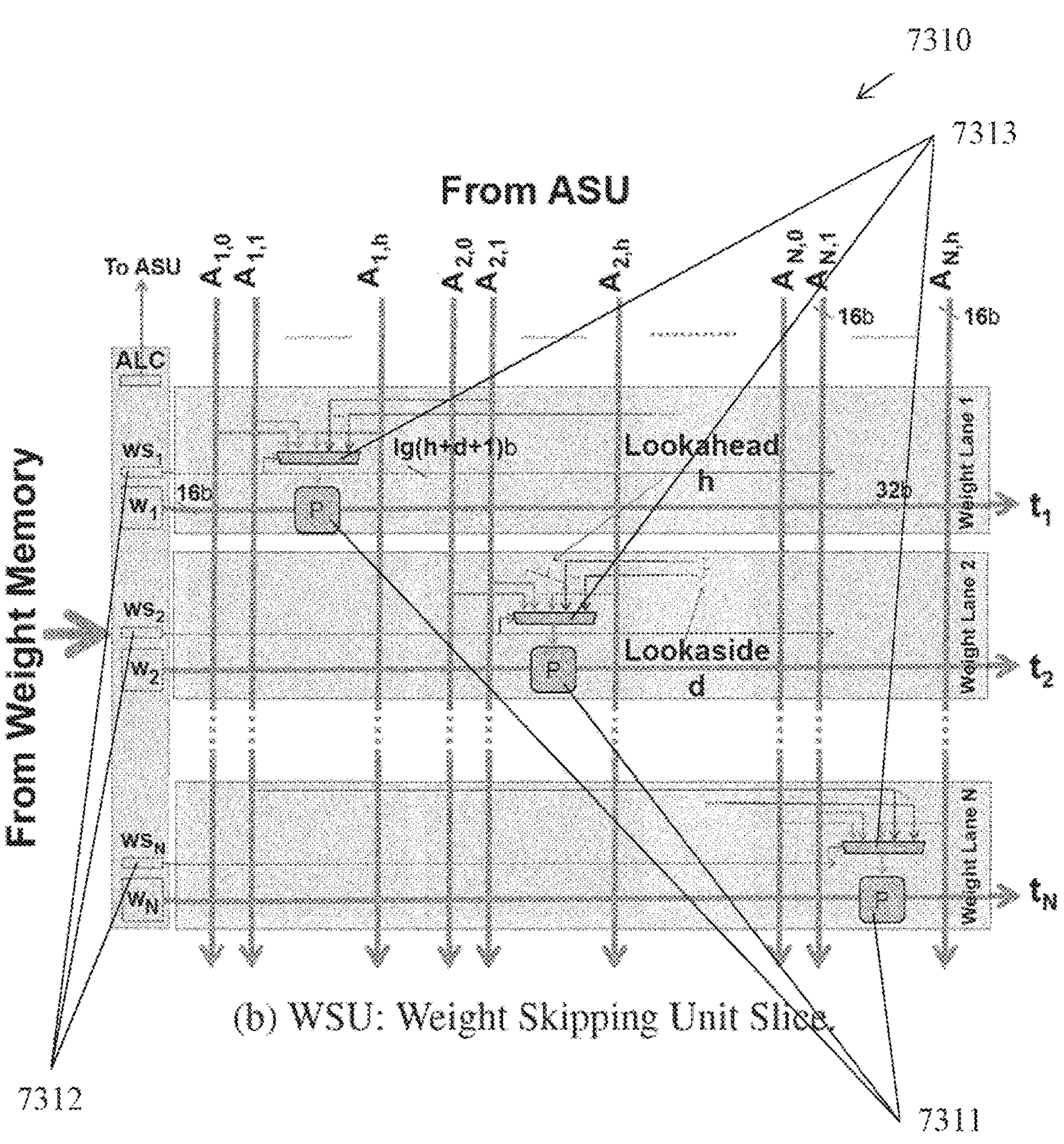
Figure 7C:
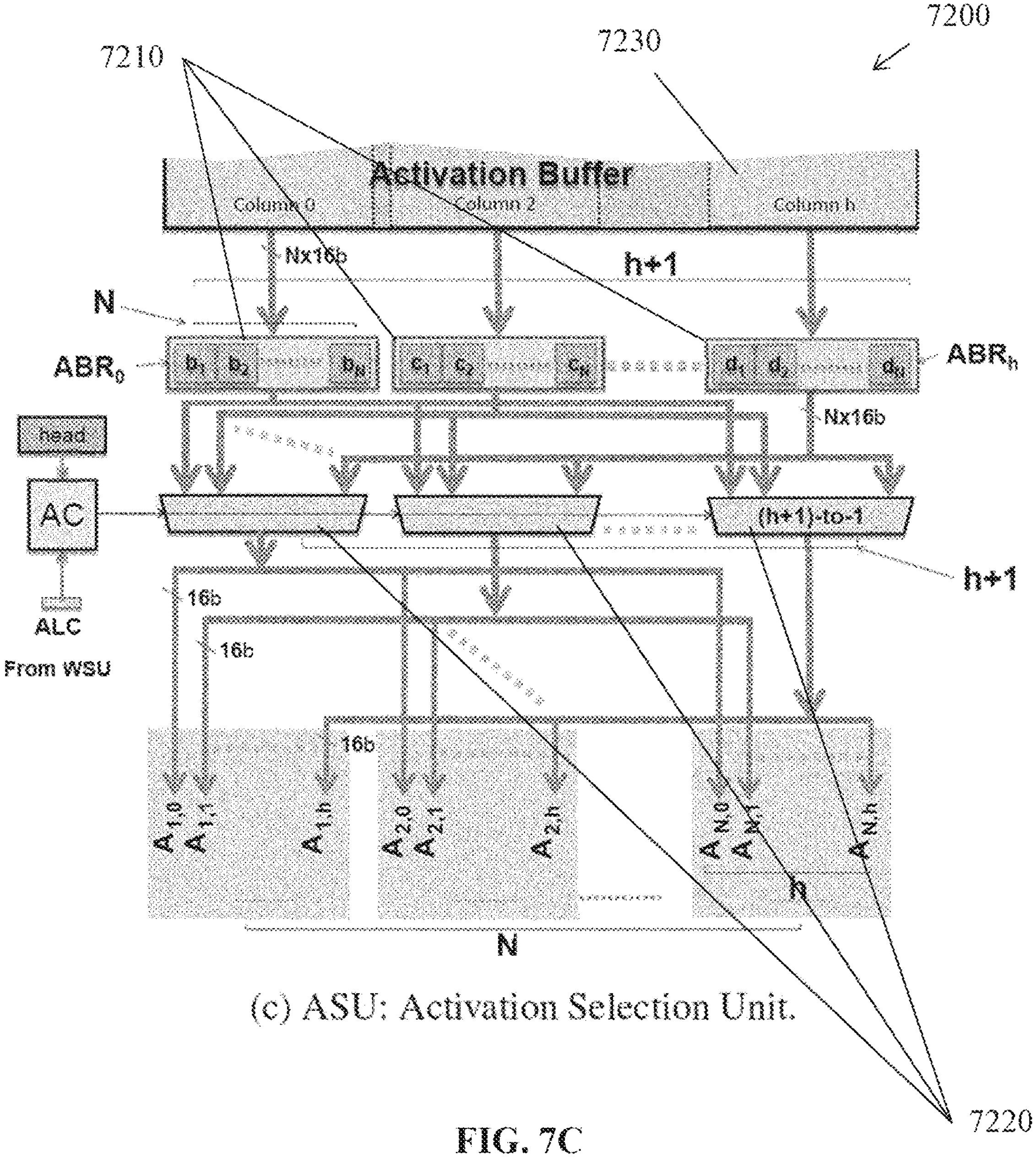

FIGS. 7A to 7C depict the structure of a weight skipping accelerator tile 7000. Accelerator tile 7000 processes N produces per filter in parallel for k filters. Tile 7000 includes an Activation Select Unit (ASU) 7100 which buffers activations as they are provided by an activation memory 7200. ASU 7100 rearranges activations so that the Weight Skipping Unit (WSU) 7300 can straightforwardly select the appropriate activations.

A WSU slice 7310 of WSU 7300 is shown in further detail in FIG. 7B. WSU 7300 includes one slice per filter for a total of k slices per tile. The WSU slice 7310 of accelerator 7000 reads via a single weight memory 7400 port a column of prescheduled weights along with their multiplexer select metadata. WSU 7300 reads N×k weight and metadata pairs plus and activation lane control (ALC) field per access. As depicted, accelerator tile 7000 processes N weights per WSU slice 7310, and all weights are processed in one step.

WSU slice 7310 takes N weights, $w_1$ to $w_N$, which each map onto a separate weight lane where it feeds one of the inputs of a multiplier 7311. A (h+d+1)-to-1 multiplexer selects the second input to the multiplier 7311. The multiplexer control signal comes from the weight select (ws) metadata 7312 which the WSU 7300 reads from the weight memory 7400. The (h+d+1)-to-1 multiplexers 7313 allow an input of enough activation values to permit the multipliers 7311 access to the possible activations.

For each weight $w_i$ processed by tile 7000 there are h+1 activations, $A_{i,0}$ through $A_{i,h}$, that correspond to a lookahead window of h activations. For example, for $w_1$, $A_{1,2}$ is the activation that is at lookahead 2, whereas for $w_N$, $A_{N,h}$ is the activation at lookahead h. The ASU 7200 orders the activations to coincide with their logical lookahead order, permitting WSU 7300 to implement lookahead and lookaside by statically assigning $A_{i,j}$ signals to multiplexer inputs. For example, the lookaside 1 connection for $w_2$ is to $A_{3,1}$ and its lookahead 2 connection is to $A_{2,2}$. All WSU slices 7310 share the same (h+1)×N activations.

As depicted in FIG. 7B, a WSU slice 7310 of accelerator tile 7000 produces N 16b×16b products per cycle, output as $t_1$ through $t_N$. Those products feed an adder tree whose output accumulates into an output activation over multiple cycles. In some embodiments, variations of the present accelerator tile 7000 may have multipliers 7311 replaced with AND gates or shifters to take advantage of activation properties.

As depicted in FIG. 7C, ASU 7200 generates the $A_{lane,lookahead}$ signals the WSU 7300 uses. The ASU 7200 is provided to supply the input activation needed by the corresponding weight lane and a step distance lookahead to the multiplier 7311. ASU 7200 includes h+1 Activation Block Registers (ABRs) 7210, each holding N input activations. Each ABR 7210 holds the N activations needed by all weight lanes at some specific lookahead distance l=0 to h. The ABRs 7210 operate logically as a circular queue with the head register pointing to the ABR holding the activations at lookahead=l=0. An array of h+1 multiplexers 7220, each (h+1)-to-1 multiplexers, shuffle the ABR outputs to the appropriate order generating the $A_{lane,lookahead}$ signals which are distributed along the weight columns as shown near the bottom of FIG. 7C. The ALC metadata the WSU 7300 reads from the WM 7400 along with each N×k weight column is used to advance the head register and implements the sliding lookahead window.

An Activation Buffer (AB) 7230 buffers activations as they are read from Activation Memory (AM) 7100. The AB 7230 has h+1 banks, each connected to one ABR 7210 via a dedicated single read port. This way, any number of ABRs 7210 can be updated per cycle concurrently, effectively advancing the lookahead window as instructed by the ALC metadata. This arrangement allows the accelerator tile 7000 to also skip over columns comprising only ineffectual weights.

While weight skipping exploits weight sparsity, it does not exploit any of the potentially valuable properties of the input activations. In some embodiments of the present invention an accelerator or an accelerator tile may be structured to take advantage of properties of input activations, or to take advantage of properties of both input activations and weights. Embodiments of the present invention deliver different area, performance, and energy efficiency tradeoffs. Some embodiments exploit the effectual bit content of activations and prioritize performance. Some embodiments exploit fine-grain dynamic activation precision variability and priorities energy efficiency. Some embodiments deliver benefits for all activations, whether ineffectual or not. The embodiments discussed in detail below do not seek to eliminate ineffectual activations, but both embodiments do exploit ineffectual activation.

Many activation bits of an average set of input activations to a layer of a neural network are zero, even of the fraction of activations that are non-zero, and thus are ineffectual during multiplication. Embodiments of the present invention exploit ineffective activation bits, either separately or in combination with exploiting weight sparsity.

Figure 8:
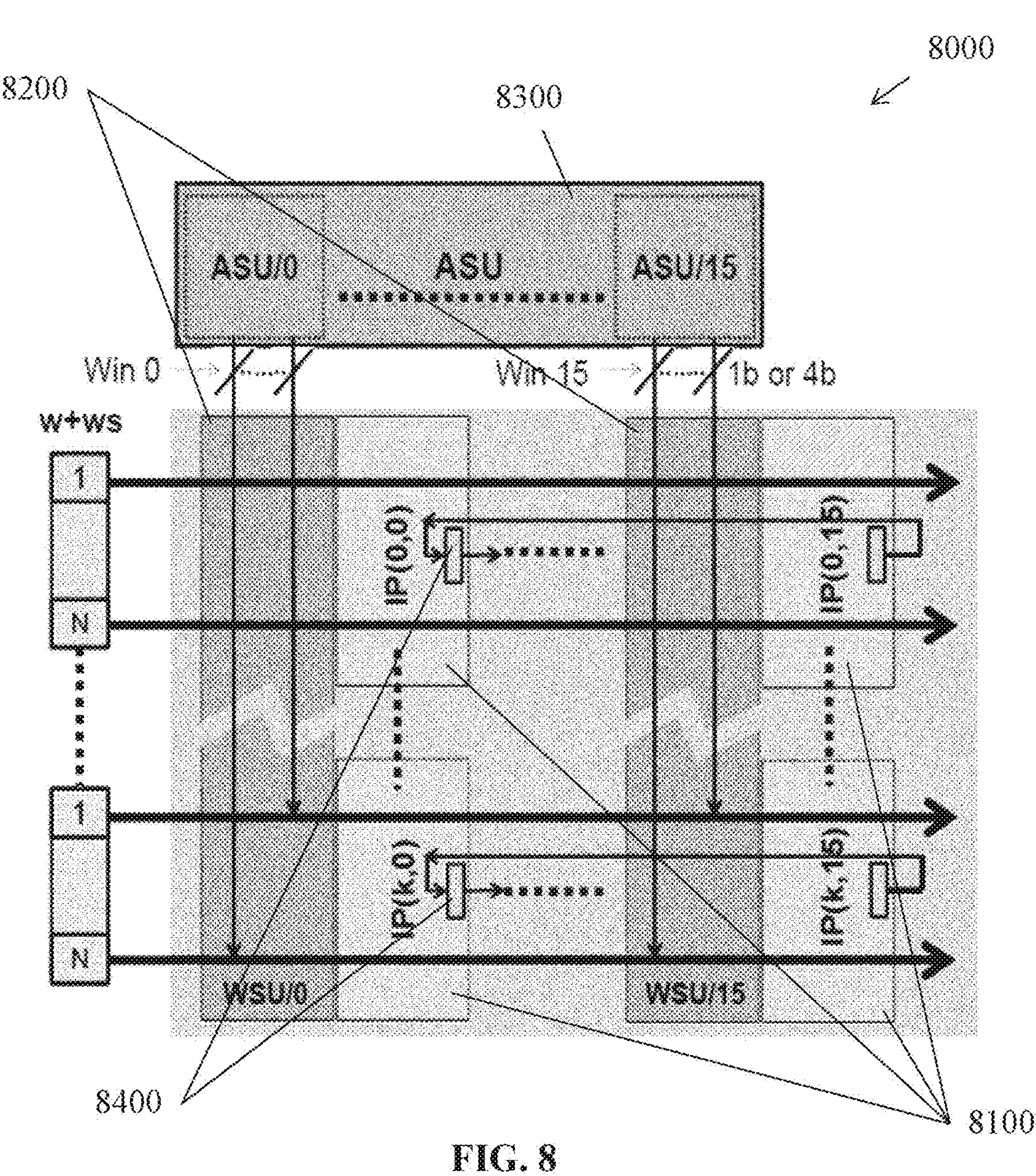
FIG. 8 is a schematic diagram of accelerator tile architecture adding the capability to skip ineffectual activation bits, according to an embodiment.

As depicted in FIG. 8, accelerator 8000 is structured to process only the effectual bits of activations bit-serially over time. For example, accelerator 8000 processes the activation value {0000 0000 1000 1111b} over 3 cycles respectively multiplying the corresponding weight by the following signed powers of two: $\{+2^7, -2^4, +2^0\}$. These powers are the Booth-encoded representation of the activation value. This structure allows accelerator 8000 to process input activations in an execution time proportional to the number of effectual activation bits. However, since activations are now processed bit-serially, overall throughput will be lower if accelerator 8000 processes only N×N weight and activation pairs per cycle. Accelerator 8000 compensates for this loss of throughput by processing 16 activation windows in parallel, thus increasing overall throughput. As a result, the same weight can be reused over the 16 windows and the WM interface remains as it was in earlier embodiments. However, accelerator 8000 maintains all lanes that feed a common adder tree synchronized across activation groups, that is, all wait for the one processing the activation with the most effective bits to finish before proceeding with the next group of activation values. A designer may choose a different number of activation windows to process in parallel to achieve a desired performance, area, energy efficiency target.

In design, accelerator 8000 of FIG. 8 reflects many of the elements of the Pragmatic Accelerator (PRA) design for processing activations (for a discussion of PRA design, see: J. Albericio, A. Delmás, P. Judd, S. Sharify, G. O'Leary, R. Genov, and A. Moshovos, "Bit-pragmatic deep neural network computing," in *Proceedings of the 50th Annual IEEE/ACM International Symposium on Microarchitecture, MICRO*-50 '17, pp. 382-394, 2017, hereby incorporated by reference). The PRA design targets dense CNNs and exploits ineffectual activation bits to deliver execution time proportional to the effectual activation bit content. The PRA design processes activations bit-serially, one effectual bit at a time. A per tile unit converts the activations into a stream of effectual powers of two, or oneffsets, after applying a modified Booth Encoding. Since the PRA design multiplies a weight with a power of two each cycle, a shifter is sufficient instead. The oneffsets sign is used to add or subtract the shifted weight via the adder tree. To maintain a throughput of an equivalent bit-parallel design, a PRA design processes multiple activation windows in parallel, allowing the design to reuse the same weight across the window processing.

The back-end of the Pragmatic accelerator (PRA) design may be modified in some accelerator embodiments. In some embodiments, like PRA, accelerator embodiments processes activations bit-serially one effectual power at a time. A per ABR unit converts the activations into a stream of effectual powers of two, or oneffsets, after applying a modified Booth Encoding. In some embodiments, accelerators of the present invention use shifters to multiply weights with oneffsets and the result is added or subtracted via the adder tree according to the oneffset sign. To guarantee that accelerators of the present invention always match or exceed the throughput of an equivalent bit-parallel design, these accelerators may process 16 activation windows concurrently. This allows these accelerators to reuse the same weight across 16 IP units.

FIG. 8 shows a tile of accelerator 8000. The k inner product (IP) units of FIG. 3 have been expanded into a grid of 16×k simpler IP units 8100. The key modifications of the Pragmatic design are the inclusion of the WSU and ASU slices and the ability to move partial sums by one column using a per row ring. Specifically, the original WSU discussed in relation to FIGS. 7A to 7C is sliced in 16 columns 8200, WSU/0 through WSU/15, one per column of k IPs 8100. Each of those 16 columns corresponds to a different window. Each IP 8100 has a 16-input adder tree and instead of N multipliers it has N shifters. Each of these shift the 16b weight input as directed by the activation oneffset input. All IPs 8100 along the same row share the same w (weight) and ws (weight select) signals and they all perform exactly the same lookahead and lookaside activation selections. Unlike FIG. 6, the multiplexers here select 4b activation oneffsets, greatly reducing area. These oneffsets encode a shift by up to 3 positions plus a sign and an enable. For each column, a corresponding ASU slice, ASU/0 to ASU/15 of ASU 8300, provides as before data for N activation groups, one per weight lane, each containing data for h activations to support lookahead. Unlike FIG. 6, the ASU provides 4b oneffsets. Since all WSU columns 8200 execute the same weight schedule, all 16 ASU slices access the activation buffer in tandem and share the same activation selection logic and signals.

In the Pragmatic accelerator design, since each column computes a different window and where windows overlap, each input activation has to appear at different columns eventually. As a result, simply expanding the Pragmatic accelerator design would require a crossbar between the AM and the activation buffers of each tile. TCL statically interleaves the input activation space to the 16 IP columns so that no crossbar is needed. Specifically, all activations a(c, x, y) map to column (x×S) MOD 16. With this modification it is no longer possible to compute each output activation fully at an IP. Accelerator embodiments slide the partial sums by one column horizontally using the rings 8400, shown on FIG. 8. The Pragmatic accelerator design already includes connections between adjacent column IPs which it uses to read out the results once completed and to increase utilization for layers with few channels. A partial sum stays at a column as long as necessary to accumulate all sums with the activations that map to the column. Then all partial sums advance in tandem to the next column. Table 1 shows an example of how processing proceeds in JaZe.

TABLE 1

Processing: Processing 16 windows of a 3 × 3 filter over an input activation array with 16 channels takes 9 steps. In step 0, output o(0, 0, 0) starts at column 0 and moves to columns 1 and 2 in steps 3 and 6 respectively. Activation a(c, x, y) appears only at column x MOD 16. In this example, the coordinates are a(channel, x, y).

| | IP Column | | | | |
|---|---|---|---|---|---|
| | 0 | 1 | 2 | ... | 15 |
| | Step 0 | | | | |
| in | a(0-15, 0, 0) | a(0-15, 1, 0) | a(0-15, 2, 0) | ... | a(0-15, 15, 0) |
| out | o(0, 0, 0) | o(0, 1, 0) | o(0, 2, 0) | ... | o(0, 15, 0) |
| | Step 1 | | | | |
| | a(0-15, 0, 1) | a(0-15, 1, 1) | a(0-15, 2, 1) | ... | a(0-15, 15, 1) |
| | o(0, 0, 0) | o(0, 1, 0) | o(0, 2, 0) | ... | o(0, 15, 0) |
| | Step 2 | | | | |
| | a(0-15, 0, 2) | a(0-15, 1, 2) | a(0-15, 2, 2) | ... | a(0-15, 15, 2) |
| | o(0, 0, 0) | o(0, 1, 0) | o(0, 2, 0) | ... | o(0, 15, 0) |
| | Step 3 | | | | |
| | a(0-15, 16, 0) | a(0-15, 1, 0) | a(0-15, 2, 0) | ... | a(0-15, 15, 0) |
| | o(0, 15, 0) | o(0, 0, 0) | o(0, 1, 0) | ... | o(0, 14, 0) |
| | Step 4 | | | | |
| | a(0-15, 16, 1) | a(0-15, 1, 1) | a(0-15, 2, 1) | ... | a(0-15, 15, 1) |
| | o(0, 15, 0) | o(0, 0, 0) | o(0, 1, 0) | ... | o(0, 14, 0) |
| | | | ... | | |
| | Step 8 | | | | |
| | a(0-15, 16, 2) | a(0-15, 17, 2) | a(0-15, 2, 2) | ... | o(0-15, 15, 2) |
| | o(0, 14, 0) | o(0, 15, 0) | o(0, 0, 0) | ... | o(0, 13, 0) |

In some embodiments, ineffective activations or activation bits may be exploited differently. For example, in some embodiments the effectual bit content of activations is exploited by exploiting the precision requirements. The precision activation need varies across networks and across layers and can be determined, such as through profiling. In an embodiment, compared to the baseline precision of 16b, execution time could be reduced by 16/p where p is the precision activations uses. For example, the Stripes (STR) accelerator tile design may be employed. The STR accelerator tile design is disclosed in P. Judd, J. Albericio, T Hetherington, T Aamodt, and A. Moshovos, "Stripes: Bit-serial Deep Neural Network Computing," in *Proceedings of the* 49*th Annual IEEE/ACM International Symposium on Microarchitecture, MICRO*-49, 2016 and United States Patent Application Publication No. US 2017/0357891 A1 entitled "Accelerator for Deep Neural Networks" (inventors: Patrick Judd, Jorge Albericio, Alberto Delmas Lascorz, Andreas Moshovos, and Sayeh Sharify) to The Governing Council of the University of Toronto, both of which are hereby incorporated by reference.

The STR design processes activations bit-serially, and thus takes p cycles to process an activation represented in p bits. As with the PRA design, to compensate for the loss in computation bandwidth compared to a bit-parallel design, embodiments employing a STR design process multiple windows in parallel, such as processing 16 windows in parallel. The STR design employs AND gates rather than multipliers. The block level depiction of a STR design is similar to that of the PRA design depicted in FIG. 8. However, the STR design employs an ASU that sends activations a single bit at a time instead of a single oneffset at a time and does not need to encode activations as oneffsets. In a typical STR design, fewer wires are required per activation than the PRA design, there are no shifters, and the input width of the adder tree is 16b.

The use of input activation exploiting accelerator structures may not be desired in all circumstances with weight sparsity exploiting structure. For example, while STR used profile-derived precision requirements, it has been observed that a profile-derived precision for a layer is pessimistic because the precision must accommodate any possible input, and the precision must accommodate all activations for the layer. However, in practice, only a limited set of activations for one specific input will be processed concurrently at runtime in some embodiments. Moreover, as most activations are near zero in some embodiments, this approach significantly reduces the precision needed per group of concurrently processed activations. The precision needed for each activation group is detected when the precisions are read from an Activation Memory and communicated along with activation values. Alternatively, the precision for each activation group can be detected at the output prior to storing to memory. Precision requirements can be detected for unsigned and unsigned numbers in order to accommodate weights and activation functions other than ReLU. For the above embodiment employing the STR structure, dynamic precision reduction reduces execution time, while for both the above embodiment employing the STR structure and the embodiment employing the PRA structure it reduces the number of bits that needs to be sent after reading the activations from an Activation Memory. Recall that the above embodiment employing a PRA structure generates oneffsets locally at each tile.

It has been found that the numerical precision neural networks need to operate correctly varies considerably across networks and across layers of the same network. For example, in P. Judd, J. Albericio, T. H. Hetherington, T. M. Aamodt, N. D. Enright Jerger, R. Urtasun, and A. Moshovos "Reduced-Precision Strategies for Bounded Memory in Deep Neural Nets," CoRR abs/1511.05236 (2015) ('Judd et al.'), hereby incorporated by reference, a method was proposed for determining per layer numerical precisions using profiling. However, in A. Delmas, P. Judd, S. Sharify, and A. Moshovos, "Dynamic Stripes: Exploiting the Dynamic Precision Requirements of Activation Values in Neural Networks," CoRR abs/1706.00504 (2017) ('Delmas et al.'), hereby incorporated by reference, it was observed that this variability in precision becomes more pronounced at an even smaller granularity than the layer granularity. Numerical precision refers to the number of bits needed to safely represent the numbers. In the case of fixed-point representation this would be precisely a bit count for the whole number. For other representations, it may be that separate bit counts for different components of the representation are necessary, such as the exponent or the mantissa for floating-point numbers.

Embodiments of the accelerator described exploit precision requirements to reduce the number of cycles needed to process multiplications. However, in addition to computation, communication and storage are also major challenged for Deep Learning computing. Accordingly, a method that exploits the variability in precision requirements of activations and weights is presented to reduce storage and communication needs. A specific implementation is described below. First, it is noted that the dynamic precision detection method of Delmas et al., applies to negative values as well, where a leading 0 must be looked for and 1 added to the final precision length instead of looking for a leading 1. Alternatively, a negative number can be transformed to a sign-magnitude representation, and the sign bit can be placed at the least significant position. This second approach accommodates activation functions that do not convert all negative values to zero and weights.

The description that follows assumes a 16-bit fixed-point representation for all numbers, however, the mechanism described straightforwardly applies to other representation lengths and types. The compression scheme considers input values, weights or activations, into groups of a fixed number of elements such as for example 16 or 256. Then, within each group, the maximum required precision is determined, by scanning for the position of the most significant 1-bit across all values. Negative values are converted into a sign-magnitude representation. The processing of weights can be done offline while the activations are processed at the output of each layer. The values are then packed by storing the required precision using 4 bits, and then each value using a number of bits equaling the precision for the group. For the accelerator described here, grouping will be done according to weight lanes and activation lanes and the data will be stored in memory using the virtual column approach of Judd et al. Unpacking into the data path can be done, for example, using the method of Judd et al., with a 16b-to-16b crossbar for weights. Activations can be stored along bit planes in memory, obviating the need for a crossbar. Table 2 below shows the group storage format per virtual column. The precision may be best stored separately in memory. In some embodiments, the precisions for multiple consecutive groups is stored together into a single memory block, thus amortizing the cost of this extra memory access over multiple groups.

TABLE 2

| Precision P: 4 bits | Value 1: P bits | Value 2: P bits | Value 3: P bits | ... | Value G: P bits |
|---|---|---|---|---|---|

An alternative scheme includes a bitmap where each bit represents whether a value within the group is equal to or different from zero as shown in Table 3. If the value is equal to zero, it is not coded at all. Therefore, the number of coded elements per group vary. This allows for higher compression ratios for data with large number of zeros. Unpacking is done by reading a packed group and then serially expanding the group as necessary using the bit vector to insert zeros if necessary. By fetching and unpacking a sufficient number of groups concurrently the bandwidth requirements of the accelerator can be sustained.

TABLE 3

| Precision P: 4 bits | Presence bitmap: G bits (n ones) | NZ value 1: P bits | ... | NZ value n: P bits |
|---|---|---|---|---|

Figure 14:
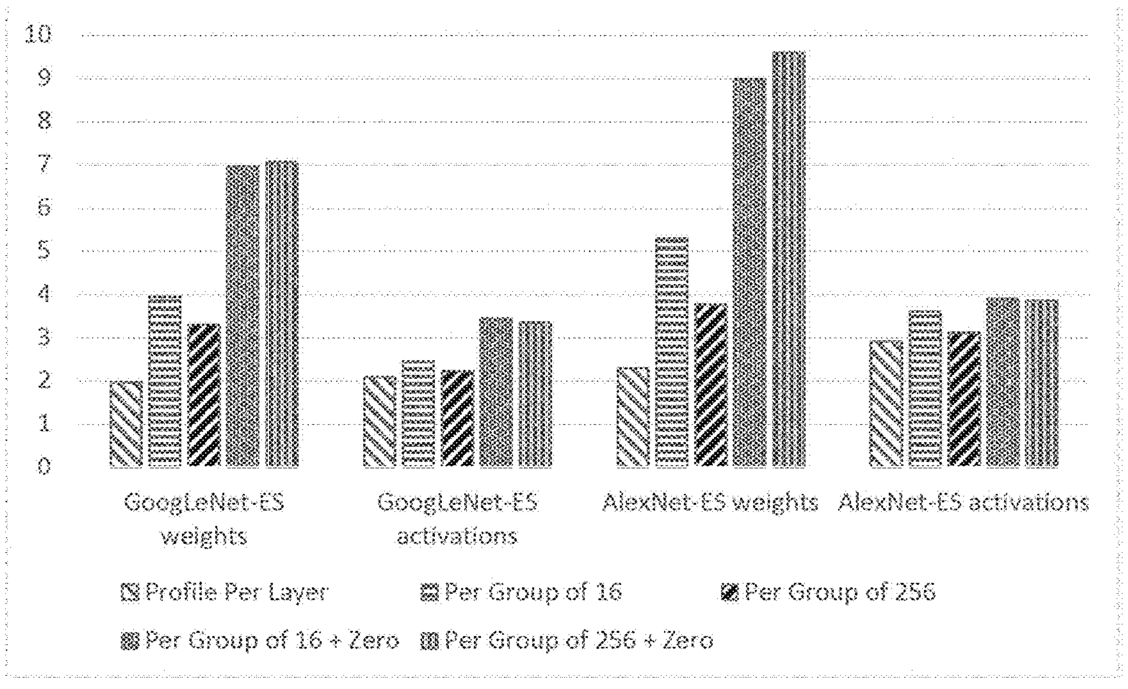
FIG. 14 is a diagram showing the performance of five compression scheme embodiments.

FIG. 14 indicates the effectiveness of both compression schemes for both weight and activation data in AlexNet-ES and GoogLeNet-ES both with and without the zero-enhanced approach described above, displayed alongside the ratio achievable using a fixed per-layer number of bits. A value of two indicates a reduction to half of the original size. Both per group schemes outperform the per layer compression scheme for weights and activations. The zero-enhanced compression scheme further improves compression rate especially for the weight. This may be particularly expected when the networks are sparse.

In combining weight property exploiting structures with activation property exploiting structures, acceleration tiles may experience a reduction in the effectiveness of activation optimization with increased lookahead structure. Specifically, in both STR and PRA structures a group of concurrently processed activations must wait for the slowest activation to process before advancing for the next group. For example, in a PRA structure it is the activation with the highest number of oneffsets that determines how many cycles would be required for the whole group. As the degree of lookahead increases, embodiments of the present invention which employ either a STR or PRA activation property exploiting structure have to consider all activations within the lookahead window. In many embodiments, the wider the lookahead window the higher the impact of such "bottleneck" activations. Generally, lookaside has no further effect as it uses the activations at a lookahead distance of 1 which are included in the synchronization group when lookahead is at least 1, as described above.

In other embodiments the activation property exploiting structure may not employ either STR or PRA structures. For example, neither STR or PRA structures attack ineffectual activations head on, which may seem counter intuitive as it has been demonstrated that often nearly half of the activations in CNNs tend to be ineffectual. Yet STR and PRA structures both deliver benefits for both ineffectual and effectual activations, and such structures can often provide improved function over structures which only attack ineffectual activations head on. Specifically, an accelerator structure employing STR or PRA structure will be at an advantage for any effectual activations while a structure which can skip ineffectual activations will be at an advantage for ineffectual activations, however the opportunity loss of an accelerator employing a STR or PRA structure will typically be much less than 1 per ineffectual activation.

For example, where all activations that are processed as a group by an accelerator employing a PRA structure happen to be zero, the accelerator will process them in a single cycle which represents an opportunity loss of only 1/16 as compared to an accelerator which can skip ineffectual activations since the accelerator employing a PRA structure processes each activation bit-serially instead of bit-parallel. In general, when an accelerator employing a PRA structure processes an ineffectual activation over p cycles, the opportunity loss is p/16, and given that on average less than 10% of the bits are effectual, the opportunity loss of not completely skipping ineffectual activation is expected to be low. Similar reasoning applies to an accelerator employing an STR structure.

Typically, ineffectual activations, dynamic precision variability and ineffectual activation bits are consequences of the distribution of activation values in networks such as CNNs:

often most activations cluster near zero and a few activations spike with values far away from zero. For image classification CNNs, often around 45% of activations are zero even after reducing their precision per layer, while often more than 90% of the activation bits are found to be zero, suggesting that the potential for performance improvement is much higher if targeting ineffectual bit content. As such, many embodiments of the present invention may employ techniques directly or indirectly taking advantage of ineffectual bit content.

Figure 9:
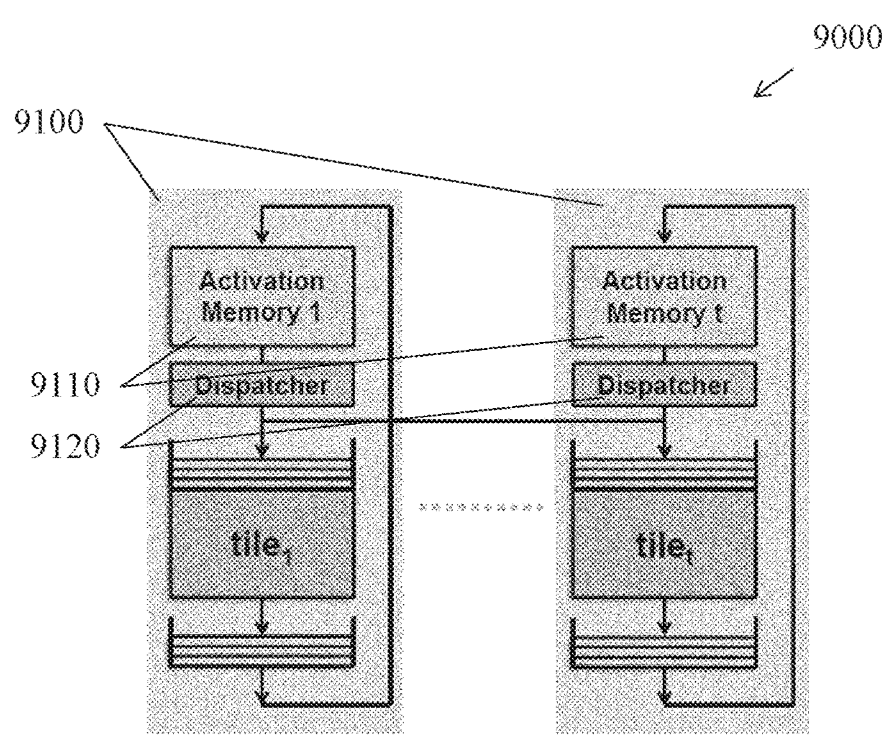
FIG. 9 is a schematic diagram of a multi-tile accelerator, according to an embodiment.

As depicted in FIG. 9, an accelerator 9000 includes multiple tiles 9100. Each tile 9100 has its own local slice of an AM 9110, a local WM (not shown), an input activation buffer (not shown), and an output activation buffer (not shown). A dispatcher 9120 per AM slice 9110 reads the appropriate activations as in STR and PRA structures, while also accommodating the lookahead needs of the structure of lookahead embodiments of the present invention. In some embodiments, to reduce energy and bandwidth requirements, the dispatcher 9120 uses profile-derived per layer precisions to read only as many activation bits as necessary from AM 9110. Prior to broadcasting each activation group to all tiles, the dispatcher 9110 trims the activations further by dynamically detecting the precision necessary given their values. Locally, each tile 9100 consumes its activations at its own pace. The buffers determine how far apart the tiles can be in the activation space. Locally, each tile 9100 can perform further processing, for example for a structure employing a PRA architecture the tile can do encoding to powers of two.

In some embodiments each tile has its own local slice of the AM, a local WM, an input activation buffer and an output activation buffer. The AM and WM are banked to sustain the bandwidth needed by the compute cores. Data is loaded from an off-chip memory and is copied to individual AM or WM tiles or multicast to multiple ones. Embodiments use compression to reduce off-chip and on-chip traffic. For both on-chip and off-chip data transfers accelerator embodiments encode activations and weights using per group precisions which are either detected dynamically at the output of the previous layer (activations) or statically (weights). Weights are packed in memory and the WM in virtual columns matching the weight lanes. In addition, zero values are not stored and instead a bit vector per group identifies the position of the non-zero values. In some embodiments, a group of 16 activations or weights may be used as offering a good balance between compression rate and metadata overhead. For each group, the precision is stored in bits and the zero-value bit-vector, an overhead of 4 bits and 16 bits respectively for what would have been 256 bits uncompressed activations or weights. Prior to copying activations, the activation buffers decompress the values.

Table 4 reports the configuration studied here. Table 4 gives an example of the configurations of an example accelerator embodiment:

TABLE 4

| Configuration of an Accelerator Embodiment | | | |
|---|---|---|---|
| DCNN or TCL | | | |
| Tiles | 4 | Filters/Tile | 16 |
| AM/Tile | 32 KB × 32 Banks | Weights/Filter | 16 |
| WM/Tile | 32 KB × 2 Banks | Precision | 16b |
| Act. Buffer/Tile | 1 KB × (h + 1) | Frequency | 1 GHz |

TABLE 4-continued

| Configuration of an Accelerator Embodiment | | | |
|---|---|---|---|
| Main Memory | 8 GB DDR4-2133 | Tech Node | 65 nm |
| Lookahead | 0-4 | Lookaside | 0-6 |
| DCNN | | | |
| Peak Compute BW | 1 Tmul/sec | Area | 29.68 mm$^2$ |
| Power | 6.94 Watt | | |

In practice, accelerator embodiments employing various aspects and features of the architecture described above have been shown to provide execution benefits.

A cycle level simulator was used to evaluate the relative performance of a few embodiments by modeling execution time for convolution and fully connected layers. Table 5 reports the CNNs used, which were sparsified (for a further discussion of these, see: Yang, Tien-Ju and Chen, Yu-Hsin and Sze, Vivienne, "Designing Energy-Efficient Convolutional Neural Networks using Energy-Aware Pruning," in *IEEE Conference on Computer Vision and Pattern Recognition* (*CVPR*), 2017 hereby incorporated by reference). All area and energy measurements were done over layout using circuit activity for representative data inputs. The layouts were generated for a TMSC 65 mm technology using Cadence Innovus after synthesizing them with Synopsys Design Compiler. The typical case design library was used, as it yields more pessimistic results for the designs tested. All tested designs were operated at 1 GHz. SRAMs were modeled via CACTI (for further discussion, see: J Park, S. Li, W. Wen, P. T P. Tang, H. Li, Y. Chen, and P. Dubey, "Faster CNNs with Direct Sparse Convolutions and Guided Pruning," in *5th International Conference on Learning Representations* (*ICLR*), 2017, hereby incorporated by reference) and eDRAM via Destiny (for further discussion, see: N. Muralimanohar and R. Balasubramonian, "Cacti 6.0: A tool to understand large caches," HP technical report HPL-2009-85, http://www.hpl.hp.com/techreports/2009/HPL-2009-85.html, hereby incorporated by reference.

TABLE 5

| Networks Studied | |
|---|---|
| Network | Acronym |
| AlexNet-Eyeriss | AlexNet-ES |
| GoogLeNet-Eyeriss | GoogLeNet-ES |

The following includes a discussion of weight skipping as compared to weight and activation exploitation. The following includes evaluations of performance, energy efficiency, and area of various embodiments.

Figure 10:
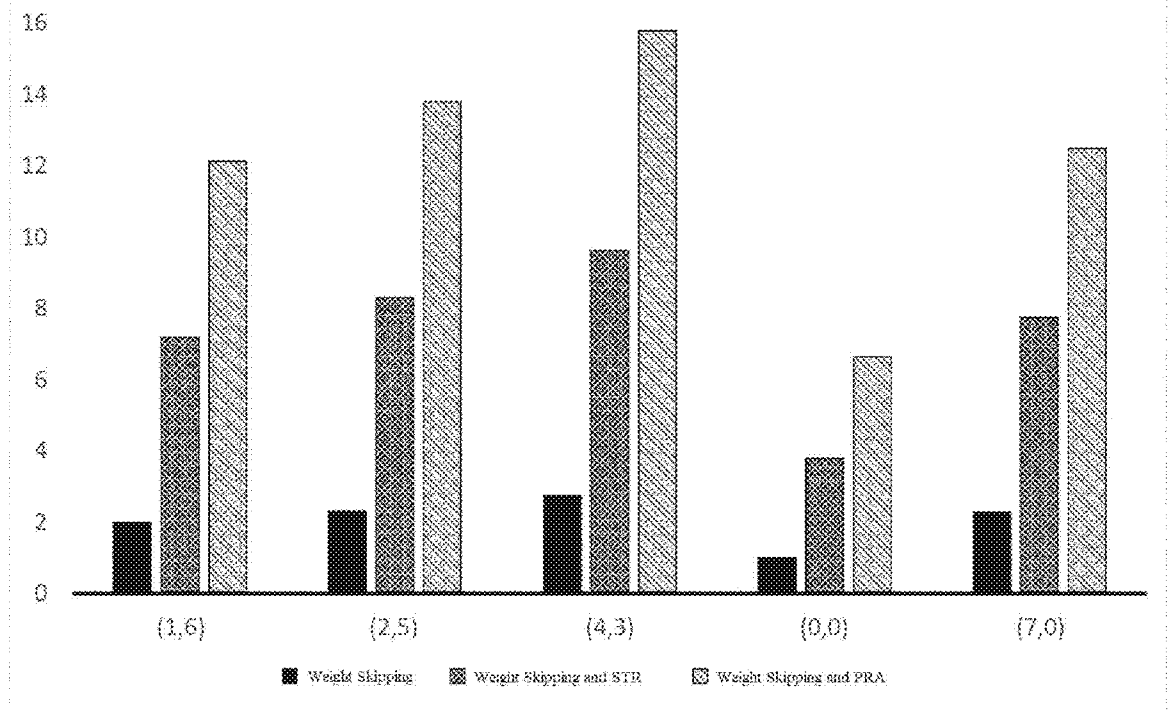
FIG. 10 is a diagram showing performance improvements on AlexNet-ES, according to three embodiments.
Figure 11:
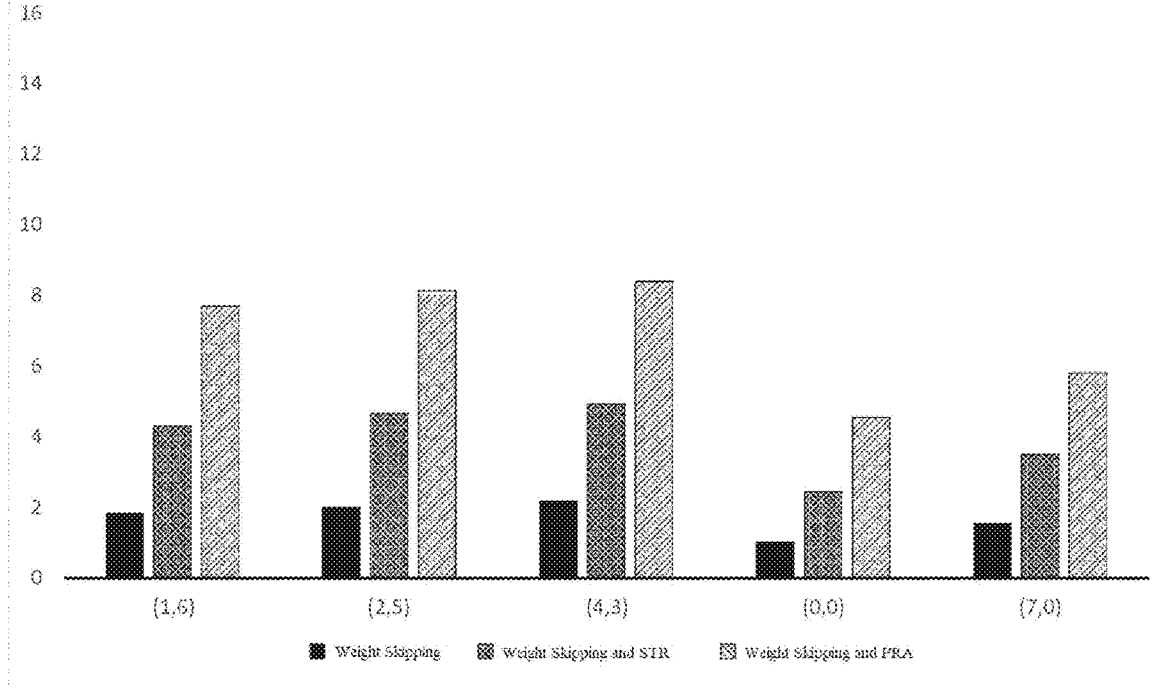
FIG. 11 is a diagram showing performance improvements on GoogLeNet-Es, according to three embodiments.

In tested embodiments various lookahead and lookaside values have been tested, and performance compared to reference structures. Results indicate that using a larger multiplexer results in better performance regardless of the lookahead and lookaside mix. In the embodiments discussed below combinations of lookahead h and lookaside d are considered such that $h+d+1=2^n$, and $n=\{8\}$. FIGS. 10 and 11 indicate speedup as against an accelerator structure which does not use weight skipping and is not structured to exploit properties of activation values. FIGS. 10 and 11 indicate speedup for lookahead and lookaside set to (lookahead, lookaside) or (h, d), as indicated at the base of each set of graphed results. FIG. 10 indicates speedup when processing ES-AlexNet, while FIG. 11 indicates speedup while processing ES-GoogLeNet. As indicated, three accelerator structure embodiments were tested, one which employed only weight skipping structure, one which employed weight skipping and STR structure, and one which employed weight skipping and PRA structure.

As indicated in FIGS. 10 and 11, adding a small number of lookaside inputs by sacrificing lookahead inputs offers a significant marginal gain in performance in testing an embodiment employing only a weight skipping structure, as can be seen in the transition from (7, 0) to (4, 3). For example, the speedup with (7, 0), or no lookaside) is 2.3 times for AlexNet-ES, as indicated in FIG. 10, and is 2.7 times with (4, 3).

FIGS. 10 and 11 indicate some of the trends that have been observed with changes in lookaside or lookahead values, as compared to setting the values to zero. Conceptually, lookaside allows a weight lane heavily populated with effectual weights to distribute its load to neighboring ones, thus reducing weight lane imbalance. Yet, it is generally unlikely for some weight lanes to have multiple adjacent heavily populated lanes. As such, arbitrarily expanding the lookaside window can be expected to lead to diminishing returns, which matches the results depicted for the given embodiments. Similarly, adding large lookahead can be understood to impact the effectiveness of the activation handling back-end as discussed above. The results indicate that for the same total number of multiplex inputs (h+d+1), and as long as there are some lookaside options, performance is better with more lookahead.

Overall, the differences appear to be relatively subdued, however, as indicated in the figures, benefits multiply greatly when combined with structures that exploit activation properties, such as use of STR or PRA structures. Accordingly, in embodiments, the relatively small differences in performance from weight skipping alone result in much larger benefits for the final designs.

Different configurations also result in different benefits. While area-wise the differences between configurations are small, the smaller the lookahead generally the lower the wire count for implementing a weight skipping structure. Accordingly, setting a lookahead and lookaside pair to (2, 5) or (4, 3) may be a reasonable compromise configuration for many embodiments and situations.

As indicated in FIGS. 10 and 11, addition of activation property exploiting structure adds to the benefits of the weight skipping structure. Various configurations may be designed to balance cost and desired performance, such as in the designs of the Activation Memory and the interconnect.

As indicated in FIGS. 10 and 11, adding the capability to exploit precision variability mostly complements ineffectual weight skipping. Even the least capable configuration shown, (1, 6), improves performance by 7.2 times and 4.3 times for AlexNet-ES and GoogLeNet-ES respectively. The Alexnet-ES set has only a few layers which are larger by comparison to the GoogLeNet-ES set. As indicated, using an activation property exploiting structure which exploits ineffectual activation bit content, such as PRA structure, results in better performance than using an activation property exploiting structure which exploits precision, such as STR structure. Where the overall performance benefit is lower than what the ineffectual bit content would suggest, the culprit may be cross activation lane synchronization, as all activation lanes within a lookahead window have to wait for the activation lane with the most oneffsets to finish before advancing to the next lookahead window. As indicated, the best configuration tested is with lookahead and lookaside set to (4, 3), which improves performance by 15.8 times and 8.4 times for AlexNet-ES and GoogLeNet-ES respectively.

While the above description has focused on weight promotion that assumed lookahead and lookaside patters must constitute a contiguous window in time and lane directions, the concept of intra-filter weight promotion is not limited to contiguous windows in the lookahead and lookaside directions but may come from an arbitrary coordinate that is a combination of both lookahead and lookaside. That is, given a lookahead distance of h, it is possible to implement a lookaside pattern that allows promotion from any subset of the 16×h positions in this window, where 16 is the filter lane width.

In a variation of such a configuration, a sparse promotion pattern may be employed that allows weight promotion from arbitrary locations in a weight stream. The term 'sparse' here refers to the face that a weight w[lane, step] which can steal from location [lane+d, step+h] may not necessarily have a connection to steal from locations [lane+d−1, step+h] or [lane+d, step+h−1], for example.

Figure 12:
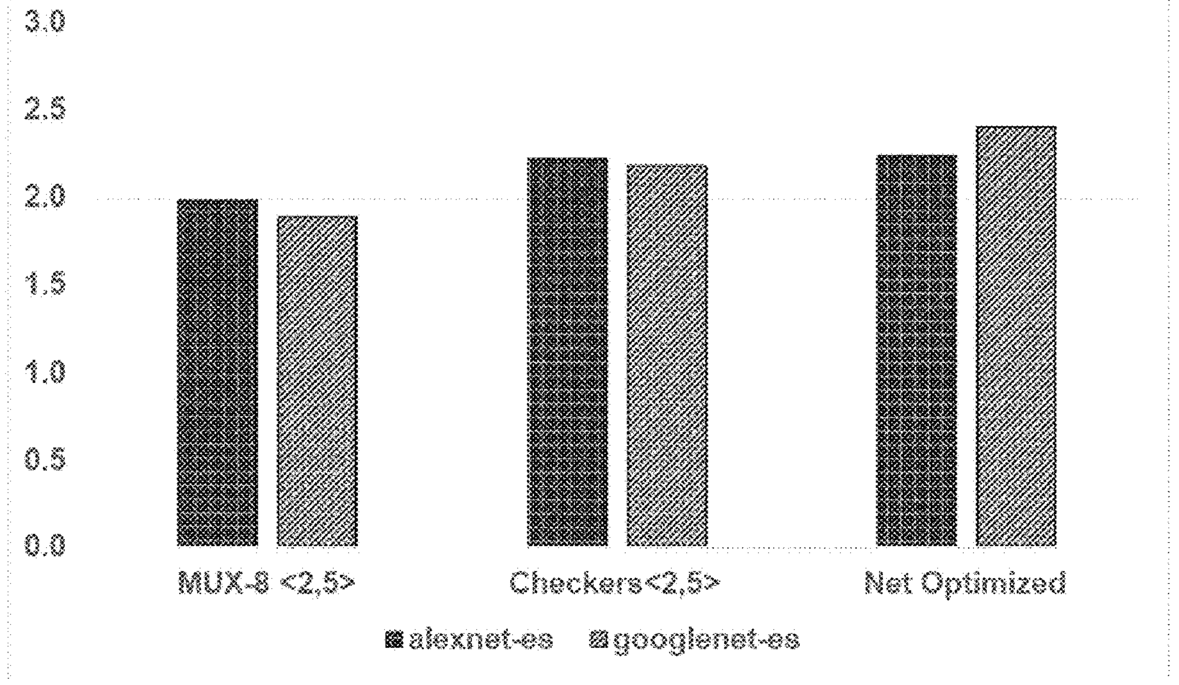
FIG. 12 is a diagram showing performance with a sparse promotion window, according to an embodiment with weight skipping alone.

In the set of three configurations compared in FIG. 12, a base configuration is presented on the left, in which a (2, 5) weight skipping configuration was employed as described above. The other two configurations are sparse configurations created from an original configuration in which lookahead was set to 2 and lookaside to 5, with the lookaside limited to a distance of 7 lanes, for a total of 2+2*7=16 possible promotion sites. Due to power and area considerations, the full connectivity was then reduced to h+d=7 promotion sites, resulting in the same size 8-input multiplexer as the base design on the left. For the Network Optimized design on the right, connection sites were iteratively removed to result in the smallest performance degradation for a given network; resulting in a connectivity pattern tailored to each network of the two tested networks. For the Checkers configuration presented in the center of FIG. 12, a fixed checkerboard-like connection pattern was employed directly, without an iterative selection of connections to remove. As indicated, a Checkers configuration provides much of the speedup benefits of the per-network optimized patterns. As expected from the description below, adding activation property-exploiting structure can be expected to multiply speedup benefits.

Various factors may drive a determination of the overall preferred structure. For example, while the use of a PRA structure appears to outperform the use of a STR structure in many embodiments, it may be more expensive due to requiring more wires per activation. Considerations of relative area and energy efficiency for example, may be considered in deciding whether performance gains are worthwhile.

Figure 13A:
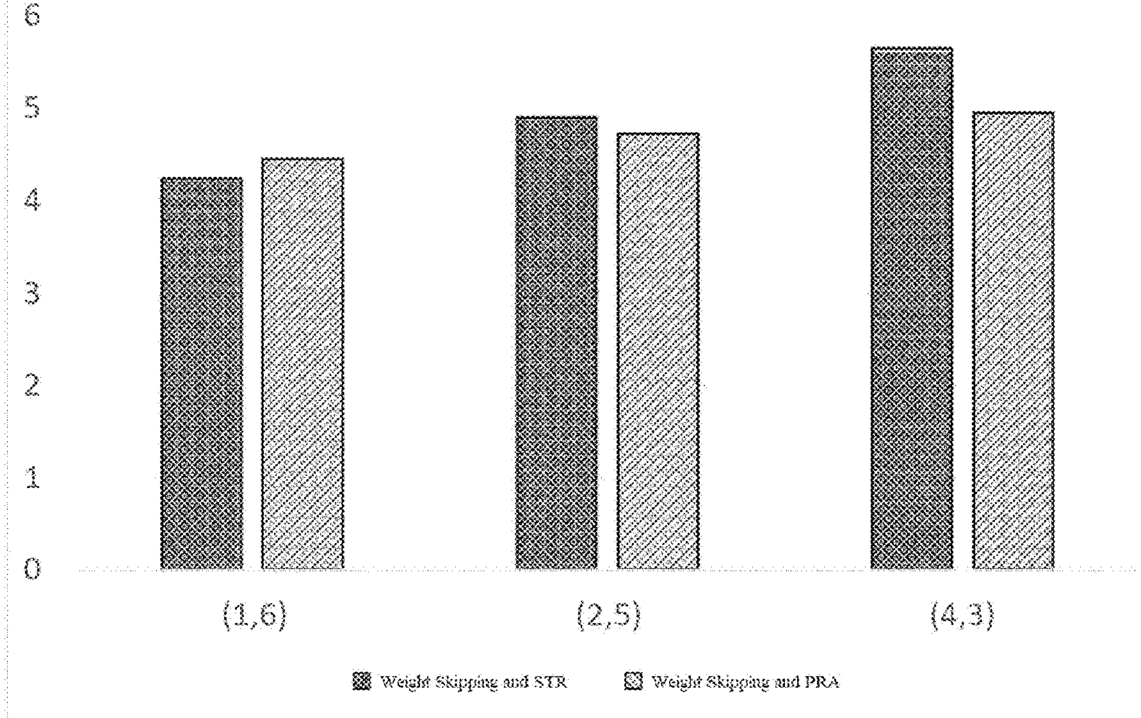
FIGS. 13A and 13B are diagrams comparing the energy efficiency of configurations of two embodiments.
Figure 13B:
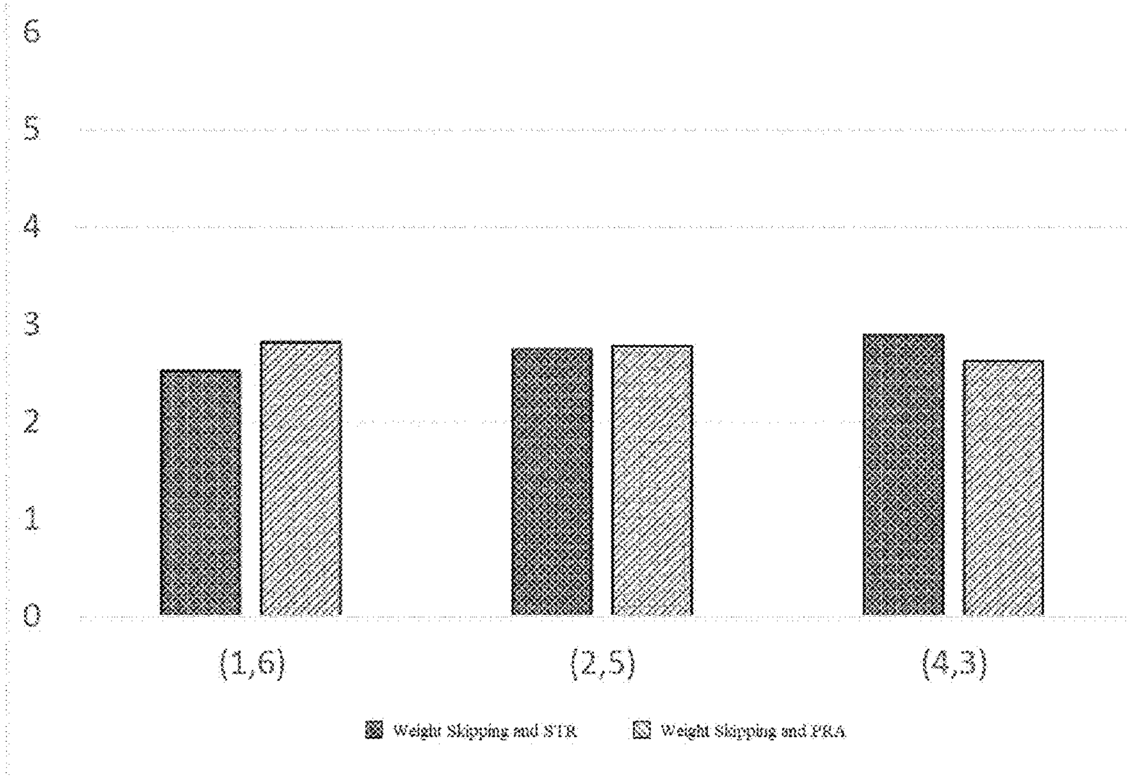

FIGS. 13A and 13B indicate the energy efficiency of weight skipping with STR architecture and weight skipping with PRA architecture as compared to an accelerator which does not employ weight skipping or activation property exploiting architecture. FIG. 13A depicts energy efficiency when running on AlexNet-ES, while FIG. 13B depicts energy efficiency when running on GoogLeNet-ES. As indicated, in each case the design is more energy efficient that the baseline, as the performance benefits outweigh the additional hardware power cost. Except where a (1, 6) configuration is employed, the use of a STR structure was more energy efficient than the use of a PRA structure, which noncontextually matches the lower cost design. The most energy efficient design tested was an embodiment including an STR structure and employing a (4, 3) configuration, which resulted in 5.6 times and 2.9 times relative energy efficiency for AlexNet-ES and GoogLeNet-ES, respectively.

Table 6 indicates the area for various accelerator embodiments, with a (1, 6) configuration detailed. The area vs. performance tradeoff is sublinear, which suggests that even if performance could scale linearly for a baseline structure which does not employ weight skipping or activation property-exploiting structure it would still trail in performance per area. Test results indicate that the performance of the baseline structure scales sub-linearly with area as the typical filter count, the typical dimensions of the filters, and the input and output result in higher underutilization for wider configurations of the baseline structure. As the sum for lookahead and lookaside is the same for each of the three configurations below, (1, 6), (2, 5), and (4, 3), the area differences among the configurations are negligible. Overall, much of the area of these embodiments is in the memories.

TABLE 6

Area Breakdown for the use of PRA and STR structure

| | PRA structure (1, 6) area (mm$^2$) | STR structure (1, 6) area (mm$^2$) | Baseline structure (mm$^2$) |
|---|---|---|---|
| Compute Core | 16.18 | 9.22 | 3.3 |
| Weight Memory | 12.03 | 12.03 | 12.03 |
| Act. Input Buffer | 0.91 | 0.91 | 0.91 |
| Act. Output Buffer | 0.91 | 0.91 | 0.91 |
| Activation Memory | 7.13 | 7.13 | 7.13 |
| Dispatcher | 0.37 | 0.39 | — |
| Offset Generator | 2.89 | — | — |
| Total | 40.58 | 30.63 | 24.35 |
| Normalized Total | 1.67 | 1.26 | 1.00 |
| | PRA structure (2, 5) area (mm$^2$) | STR structure (2, 5) area (mm$^2$) | Baseline structure (mm$^2$) |
| Normalized Total | 1.7 | 1.24 | 1.00 |
| | PRA structure (4, 3) area (mm$^2$) | STR structure (4, 3) area (mm$^2$) | Baseline structure (mm$^2$) |
| Normalized Total | 1.78 | 1.26 | 1.00 |

Table 7 below compares an embodiment of the weight skipping and activation property-exploiting accelerator disclosed herein to other available accelerators. Table 7 highlights several relevant characteristics of these designs: 1) for which input data it skips the multiply-accumulate computation, 2) for which input data it avoids a memory reference, 3) for which input data it performs a reduced cost multiply-accumulate, 4) for which input data it performs a reduced cost memory access, 5) how the input data is routed to the appropriate compute unit or storage unit, and 6) the ordering used to compute inner-products.

Cnvlutin (see: J. Albericio, P. Judd, T Hetherington, T Aamodt, N. Enright Jerger, and A. Moshovos, "Cnvlutin: Ineffectual-neuron-free deep neural network computing," in 2016 *IEEE/ACM International Conference on Computer Architecture* (*ISCA*), 2016 and PCT Patent Application Publication No. WO 2017/214728 A1 (inventors: Patrick Judd, Jorge Albercio, Andreas Moshovos, Sayeh Sharify and Alberto Delmas Lascorz) entitled Accelerator for Deep Neural Networks to The Governing Council of the University of Toronto, both of which are hereby incorporated by reference) skips both the computation and the memory access for ineffectual activations (IA). It requires no special input or output routing mechanism other than independent weight ports per group of weights that pair up with each activation.

Cambricon-X (see: S. Zhang, Z. Du, L. Zhang, H. Lan, S. Liu, L. Li, Q. Guo, T Chen, and Y. Chen, "Cambricon-x: An accelerator for sparse neural networks," in *49th Annual IEEE/ACM International Symposium on Microarchitecture, MICRO* 2016, Taipei, Taiwan, Oct. 15-19, 2016, pp. 1-12, 2016, hereby incorporated by reference) exploits ineffectual weights (IW) in an inner product based accelerator. Non-zero weights are compacted in memory and tagged with deltas (distance between weights). Each cycle one PE (equivalent to our inner product unit) fetches 16 weights and selects the corresponding 16 activations from a vector of 256. Chained adders are used to decode the deltas into absolute offsets. It uses a 256-wide input activation crossbar to pair up activations with the corresponding weights. This approach is similar to the weight skipping accelerator of the present invention with a very large 16×16 lookahead window and encoded mux selects. This requires a memory interface for 256 activations. The authors discuss that this activation bandwidth makes their approach impractical for scalable accelerators.

SCNN (see: A. Parashar, M Rhu, A. Mukkara, A. Puglielli, R. Venkatesan, B. Khailany, J. Emer, S. W. Keckler, and W. J. Dally, "Scnn: An accelerator for compressed-sparse convolutional neural networks," in *Proceedings of the 44th Annual International Symposium on Computer Architecture, ISCA* '17, (New York, NY, USA), pp. 27-40, ACM, 2017 hereby incorporated by reference) skips computations and memory accesses for both ineffectual weights and ineffectual activations. It compacts weights and activations in memory where only the effectual elements are stored each followed by the number of ineffectual elements that have been omitted. A 16×32 output crossbar routes multiplication results to 32 accumulator banks. SCNN is designed to minimize input read bandwidth. Since SCNN uses 4×4 Cartesian Products it is only able to use 4 of the 16 multipliers for FCLs, which have no weight reuse.

The weight skipping accelerator of the present invention skips computations and memory accesses for ineffectual weights, albeit to a different degree than SCNN or Cambricon-X. It reduces the bandwidth and energy cost of the memory accesses for both ineffectual and effectual activations (EA). It matches activations and weights using a hybrid input weight-static/activation-dynamic approach since it utilizes a sparse shuffling network for the input activations and restricted static scheduling for the weights.

To capture sparsity, SCNN and Cambricon-X use dense hardware interconnect. SCNN uses an output crossbar whereas Cambricon-X uses an input crossbar. The weight skipping accelerator of the present invention uses a sparse input interconnect to capture a sufficient number of ineffectual weights and compensates for the loss in opportunity by targeting all activations instead.

TABLE 7

Comparison of CNN Accelerators

| | Skip MACC | Skip Memory Access | Reduced MACC | Reduced Memory Access | Data Routing Type & Mechanism | InnerSpatial Dataflow |
|---|---|---|---|---|---|---|
| Cnvlutin | IA | IA | — | — | Weight-Dynamic/Activation-Static Sparse at Input: Independent Weight Ports | Dot Product Reduction |
| Cambricon-X | IW | IW | — | — | Weight-Static/Activation-Dynamic Dense at Input: Activation Crossbar | Dot Product Reduction |
| SCNN | IA + IW | IA + IW | — | — | Weight-Dynamic/Activation-Dynamic Dense at Output: Product Crossbar | Cartesian Product |
| Present Accelerator | IW | IW | IA + EA | IA + EA | Weight-Static/Activation-Dynamic Sparse at Input: Sparse Shuffling Network for Activations | Dot Product Reduction |

As presented in the embodiment of FIG. 7B, the front-end uses per weight multiplexer signals (ws in FIG. 7B) which allow each weight lane to perform a weight promotion independently of the others. However, these signals represent a memory overhead. Reducing this overhead is preferable and more so the narrower the weight data width. To this end, we make the following observations: 1) using per weight ws signals amounts to over-provisioning as, when considering all ws signals per PE, not all combinations are valid; and 2) eliminating even some of the valid combinations—e.g., never occurring or infrequent ones—may not adversely affect TCL's ability to exploit enough of the sparsity. Accordingly, we can restrict the combinations of weight movements that the TCL front-end supports and thus reduce the number of bits needed to specify which schedule to use at every step. For example, we can store a schedule select field (SS) per group of weights. TCL can expand the SS into per weight ws signals in the tiles, a surgical modification to the design. For example, a 4-bit SS field per group of 16 weights can support 2S S=16 different schedule patterns, each mapping to a 3b 16=48b vector comprising 16 ws signals. The mapping of SS signals to ws can be static or programmable. In the latter case it can be provided at an appropriate granularity such as per filter or per layer. For our example, a 16×48b table can map these SS signals to a set of 16 schedule steps per filter. Profiling shows that such an arrangement will not impact performance considerably for the networks studied (e.g., it covers 96% of all scheduling steps in GoogleNet-ES).

Figure 15:
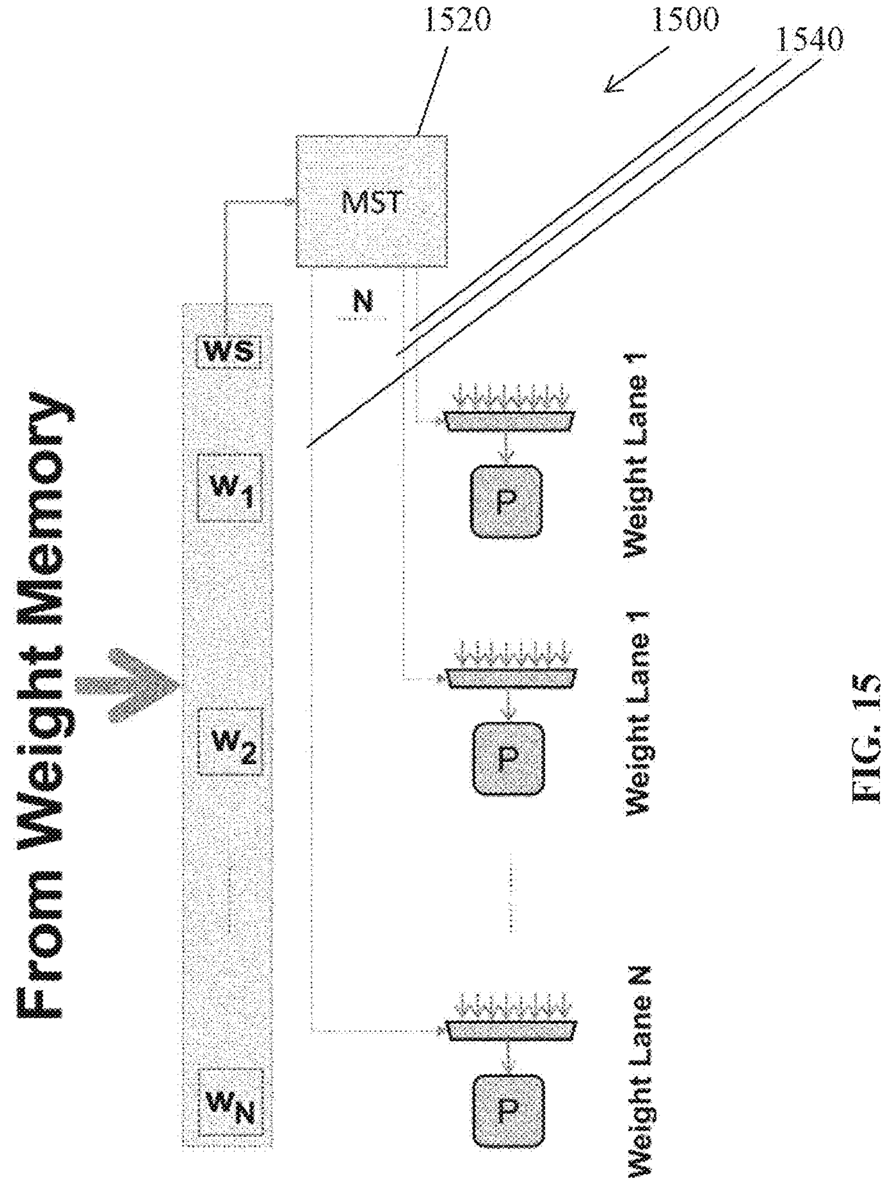
FIG. 15 is a schematic diagram of an embodiment where a Mux Select Table (MST) is introduced to each filter lane.

FIG. 15 shows an implementation of the aforementioned approach. In this implementation 1500 a Mux Select Table (MST) 1520 is introduced to each filter lane 1540. Alternatively, the MST can be shared among multiple lanes. The MST can be used to load only some of the most frequently used combinations of mux select signals. The loading can be done at convenient intervals such as once per layer per filter, every few layers, or even at sub-filter granularity. In this implementation, a small ws field per row of weights can be used to specific the schedule to be used in each step. As a result, the overhead of the select signals can be greatly reduced.

The front-end embodiment may be used to accelerate training as well as long as sparsity is present. This is the case for example in selective backpropagation methods where only some of the updates are performed. Such methods effectively convert some of the weight update values to zero and thus introduce sparsity during the backpropagation phase. At the output of each layer during backpropagation a lightweight implementation of the scheduler, most preferably of the greedy one and in hardware, can rearrange the updates prior to sending them to the processing elements. The front-end is data type agnostic and can thus be used with floating-point, fixed-point or mixed representations during the forward and backpropagation phases alike.

As will be appreciated by those skilled in the art, in operation the aforementioned components may be controlled by a controller, which may for example be a programmable finite state machine or a programmable processor which may control the accelerator as a functional unit. According to an embodiment, the programmable finite state machine may have several control and data registers and potentially a program and data memory, and outputs the various control signals to the other components described herein in the neural network system.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A neural network accelerator tile for exploiting input sparsity defining a set of weight lanes and a set of activation lanes, each weight lane corresponding to an activation lane, the neural network accelerator tile comprising:

a weight memory configured to supply each weight lane of the set of weight lanes with a weight and a weight selection metadata of the respective weight lane weight indicating a position of the weight lane weight in a weight schedule, the position of the weight lane weight indicating one or more cycles during which the weight lane weight is to be combined with one or more input activation values determined based on the activation lanes corresponding to the one or more input activation values;

an activation selection unit comprising buffers configured to receive a set of input activation values and activation multiplexers configured to rearrange the set of input activation values based on the position of the weight lane weight in the weight schedule, to supply each activation lane with a set of rearranged activation values;

a set of multiplexers, the set of multiplexers including at least one multiplexer per pair of activation and weight lanes, each multiplexer configured to select a combination activation value for the activation lane from the activation lane set of rearranged activation values based on the weight lane weight selection metadata of the respective weight lane weight indicating the position of the weight lane weight in the weight schedule; and a set of combination units, the set of combination units including at least one combination unit per multiplexer, each combination unit comprising at least one of a multiplier, an adder, and a shifter configured to combine the activation lane combination value with the weight lane weight to output a weight lane product, wherein a first multiplexer of the set of multiplexers selects a first rearranged activation value associated with a first weight lane weight from one of an activation lane for a lookahead operation of a first weight lane and an activation lane for a lookaside operation of the first weight lane based on a first weight selection metadata of the first weight lane, wherein the lookahead operation is an operation to remove ineffectual weights of a first weight schedule of the first weight lane using first weight lane weights of the first weight lane, wherein the lookaside operation is an operation to remove ineffectual weights of the first weight schedule of the first weight lane using second weight lane weights of a second weight lane, and wherein each effective weight of the first weight schedule of the first weight lane has a corresponding piece of metadata to identify the position of the effective weight in an original dense weight schedule such that the effective weight is matched at runtime with a corresponding activation value.

2. The neural network accelerator tile of claim 1, further comprising an activation memory configured to supply the set of input activation values to the activation selection unit.

3. The neural network accelerator tile of claim 1, wherein each multiplexer of the set of multiplexers is configured to select the combination activation from the corresponding set of rearranged activation values and from a set of additional lane activation values, the set of additional lane activation values formed of at least one rearranged activation value of at least one additional activation lane.

4. The neural network accelerator tile of claim 1, further comprising an adder tree configured to receive at least two eight lane products.

5. The neural network accelerator tile of claim 1, wherein the weight lane weights of the set of weight lanes define at least one neural network filter.

6. The neural network accelerator tile of claim 1, wherein the combination unit is one of a multiplier, an adder, and a shifter.

7. A neural network accelerator comprising at least two tiles of claim 1.

8. The neural network accelerator tile of claim 1, wherein each set of rearranged activation values includes a standard weight activation value and at least one lookahead activation value.

9. The neural network accelerator tile of claim 1, implemented on an activation efficiency exploiting accelerator structure.

10. The neural network accelerator tile of claim 1, wherein the set of input activation values are activation bits.

11. The neural network accelerator tile of claim 1, wherein the set of input activation values are signed powers of two.

12. The neural network accelerator tile of claim 3, wherein the set of multiplexers is a set of multiplexers of a uniform size.

13. The neural network accelerator tile of claim 12, wherein the uniform size is a power of two.

14. The neural network accelerator tile of claim 13, wherein the size of the set of rearranged activation values is larger than the size of the set of additional lane activation values.

15. The neural network accelerator tile of claim 12, wherein the set of rearranged activation values and the set of additional lane activation values are combined to generate a combined set of activation values, and the combined set of activation values contains 8 activations.

16. The neural network accelerator tile of claim 3, wherein the set of additional lane activation values is formed of at least one rearranged activation value from each of at least two additional activation lanes.

17. The neural network accelerator tile of claim 16, wherein the at least two additional activation lanes are non-contiguous activation lanes.

18. The neural network accelerator tile of claim 1, wherein the neural network accelerator tile is configured to receive the set of input activation values as at least one set of packed activation values stored bitwise to a required precision defined by a precision value, the neural network accelerator tile configured to unpack the at least one set of packed activation values.

19. The neural network accelerator tile of claim 18, wherein the at least one set of packed activation values includes a first set of packed activation values and a second set of packed activation values, the first set of packed activation values stored bitwise to a first required precision defined by a first precision value and the second set of packed activation values stored bitwise to a second required precision defined by a second precision value, the first precision value independent of the second precision value.

20. The neural network accelerator tile of claim 18, wherein the neural network accelerator tile is configured to receive a set of bit vectors including a bit vector corresponding to each set of packed activation values of the set of input activation values, the neural network accelerator tile configured to unpack each set of packed activation values to insert zero values as indicated by the corresponding bit vector.

21. The neural network accelerator tile of claim 1, wherein the neural network accelerator tile is configured to receive the weight lane weights of the set of weight lanes as at least one set of packed weight lane weights stored bitwise to a required precision defined by a precision value, the neural network accelerator tile configured to unpack the at least one set of weight lane weights.

22. The neural network accelerator tile of claim 1, wherein the set of activation lanes is at least two sets of column activation lanes, each set of column activation lanes forming a column in which each activation lane corresponds to a weight lane, the neural network accelerator tile further including at least one connection between at least two columns to transfer at least one weight lane product between the columns.

23. A system for bit-serial computation in a neural network, comprising:

one or more bit-serial tiles configured according to claim 1 for performing bit-serial computations in a neural network, each bit-serial tile receiving input neurons and synapses, the input neurons including at least one set of input activation values and the synapses including at least one set of weights and at least one set of weight selection metadata, the one or more bit-serial tiles generating output neurons, each output neuron formed using at least one weight lane product;

an activation memory for storing neurons and in communication with the one or more bit-serial tiles via a dispatcher and a reducer, wherein the dispatcher reads neurons from the activation memory and communicates the neurons to the one or more bit-serial tiles via a first interface, and wherein the dispatcher reads synapses from a memory and communicates the synapses to the one or more bit-serial tiles via a second interface;

and wherein the reducer receives the output neurons from the one or more bit-serial tiles, and communicates the output neurons to the activation memory via a third interface;

and wherein one of the first interface and the second interface communicates the neurons or the synapses to the one or more bit-serial tiles bit-serially and the other of the first interface and the second interface communicates the neurons or the synapses to the one or more bit-serial tiles bit-parallelly.

24. A system for computation of layers in a neural network, comprising:

one or more tiles configured according to claim 1 for performing computations in a neural network, each tile receiving input neurons and synapses, the input neurons each including at least one offset, each offset including at least one activation value, and the synapses including at least one set of weights and at least one set of weight selection metadata, the one or more tiles generating output neurons, each output neuron formed using least one weight lane product;

an activation memory for storing neurons and in communication with the one or more tiles via a dispatcher and an encoder, wherein the dispatcher reads neurons from the activation memory and communicates the neurons to the one or more tiles, and wherein the dispatcher reads synapses from a memory and communicates the synapses to the one or more tiles, and wherein the encoder receives the output neurons from the one or more tiles, encodes them and communications the output neurons to the activation memory;

and wherein the offsets are processed by the tiles in order to perform computations on only non-zero neurons.

25. Use of the neural network accelerator tile of claim 1 for training.

26. The neural network accelerator tile of claim 1, wherein the weight lane weight selection metadata indexes a table that specifies a multiplexer select signal.

27. An accelerator tile, comprising:

an activation selection unit comprising activation buffers configured to receive a set of activation values and activation multiplexers configured to rearrange the set of activation values into at least one set of multiplexer input values based on at least one weight selection metadata of at least one weight indicating a position of the at least one weight in a weight schedule, the position of the at least one weight indicating one or more cycles during which the at least one weight is to be combined with one or more input activation values determined based on activation lanes of the one or more input activation values;

a set of weight value receptors comprising weight buffers configured to receive at least one weight and the at least one weight selection metadata;

at least one multiplexer configured to receive at least one of the at least one set of multiplexer input values and the at least one weight selection metadata, the at least one multiplexer configured to apply the at least one weight selection metadata to select at least one combination activation value from the at least one set of multiplexer input values;

at least one combinator comprising at least one of a multiplier, an adder, and a shifter configured to apply the at least one combination activation value to the at least one weight to produce at least one product, wherein the at least one product is output; and a first multiplexer of a set of multiplexers configured to select a first rearranged activation value associated with a first weight lane weight from one of an activation lane for a lookahead operation of a first weight lane and an activation lane for a lookaside operation of the first weight lane based on a first weight selection metadata of the first weight lane, wherein the lookahead operation is an operation to remove ineffectual weights of a first weight schedule of the first weight lane using first weight lane weights of the first weight lane, and wherein the lookaside operation is an operation to remove ineffectual weights of the first weight schedule of the first weight lane using second weight lane weights of a second weight lane, and wherein each effective weight of the first weight schedule of the first weight lane has a corresponding piece of metadata to identify the position of the effective weight in an original dense weight schedule such that the effective weight is matched at runtime with a corresponding activation value.

28. A neural network accelerator comprising the accelerator tile of claim 27.

29. The accelerator tile of claim 27, further including an activation memory configured to supply the set of activation values to the activation selection unit.

30. The accelerator tile of claim 27, wherein the at least one set of multiplexer input values is at least two sets of multiplexer input values and the at least one multiplexer is configured to receive at least one of the at least two sets of multiplexer input values and at least one activation value from at least one other set of multiplexer input values.

31. The accelerator tile of claim 27, wherein the combinator is at least one of a multiplier, an adder, and a shifter.

32. The accelerator tile of claim 27, wherein each set of multiplexer input values includes a standard activation value and at least one lookahead activation value.

33. The accelerator tile of claim 27, implemented on an activation efficiency exploiting accelerator structure.

34. The accelerator tile of claim 27, wherein the set of activation values are activation bits.

35. The accelerator tile of claim 27, wherein the set of activation values are signed powers of two.

36. The accelerator tile of claim 27, wherein the size of each multiplexer of the at least one multiplexer is a power of two.

37. The accelerator tile of claim 36, wherein the size of each multiplexer of the at least one multiplexer is 8.

38. Use of the accelerator tile of claim 27 for training.

39. The accelerator tile of claim 27, wherein the weight selection metadata indexes a table that specifies a multiplexer select signal.

* * * * *